US010915009B2

(12) United States Patent
Tokunaga et al.

(10) Patent No.: US 10,915,009 B2
(45) Date of Patent: Feb. 9, 2021

(54) COMPOUND-EYE CAMERA MODULE AND ELECTRONIC DEVICE

(71) Applicant: SONY CORPORATION, Tokyo (JP)

(72) Inventors: Junichi Tokunaga, Kumamoto (JP); Seiya Tsuzaki, Kumamoto (JP); Yuuji Kishigami, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/092,104

(22) PCT Filed: Mar. 31, 2017

(86) PCT No.: PCT/JP2017/013510
§ 371 (c)(1),
(2) Date: Oct. 8, 2018

(87) PCT Pub. No.: WO2017/179445
PCT Pub. Date: Oct. 19, 2017

(65) Prior Publication Data
US 2019/0121223 A1 Apr. 25, 2019

(30) Foreign Application Priority Data

Apr. 15, 2016 (JP) .................................. 2016-082089

(51) Int. Cl.
*G03B 35/08* (2006.01)
*G03B 19/07* (2021.01)
*H04N 5/225* (2006.01)

(52) U.S. Cl.
CPC .............. *G03B 19/07* (2013.01); *G03B 35/08* (2013.01); *H04N 5/225* (2013.01);
(Continued)

(58) Field of Classification Search
CPC .............................. G03B 35/00; G03B 35/08
(Continued)

(56) References Cited

U.S. PATENT DOCUMENTS

2001/0014221 A1* 8/2001 Tomita .................. G03B 35/00
396/325
2009/0296212 A1* 12/2009 Routhier ................ G03B 17/56
359/477
(Continued)

FOREIGN PATENT DOCUMENTS

CN 103562768 A 2/2014
CN 102540692 B 6/2015
(Continued)

OTHER PUBLICATIONS

International Search Report and Written Opinion of PCT Application No. PCT/JP2017/013510, dated Jun. 13, 2017, 06 pages of ISRWO.

(Continued)

*Primary Examiner* — Clayton E. LaBalle
*Assistant Examiner* — Fang-Chi Chang
(74) *Attorney, Agent, or Firm* — Chip Law Group

(57) ABSTRACT

The present technology relates to a compound-eye camera module and an electronic device in which a plurality of monocular camera modules can be fixed together by a connecting member more effectively. In the compound-eye camera module, a camera-side positioning portion for positioning formed on a camera-side reference surface of each of the monocular camera modules and a member-side positioning portion for positioning formed on a member-side reference surface of the connecting member are fitted together, to connect the plurality of monocular camera modules together, whereby the plurality of monocular camera modules can be fixed together by the connecting member more effectively. The present technology can be applied to, for example, a compound-eye camera module in which a plurality of CMOS image sensors is connected together.

17 Claims, 18 Drawing Sheets

(52) U.S. Cl.
CPC ......... *H04N 5/2257* (2013.01); *H04N 5/2258* (2013.01); *H04N 2005/2255* (2013.01)

(58) Field of Classification Search
USPC ........................................................ 396/325
See application file for complete search history.

(56) References Cited

U.S. PATENT DOCUMENTS

| | | |
|---|---|---|
| 2015/0341617 A1 | 11/2015 | Cole et al. |
| 2016/0044247 A1* | 2/2016 | Shabtay ............... H04N 5/2254 348/240.3 |

FOREIGN PATENT DOCUMENTS

| | | |
|---|---|---|
| CN | 106464785 A | 2/2017 |
| EP | 3445033 A1 | 2/2019 |
| JP | 2013-106229 A | 5/2013 |
| JP | 2014-157309 A | 8/2014 |
| JP | 2017-521897 A | 8/2017 |
| WO | 2015/179574 A1 | 11/2015 |
| WO | 2017/179445 A1 | 10/2017 |

OTHER PUBLICATIONS

Extended European Search Report of EP Patent Application No. 17782263.2, dated Dec. 10, 2018, 07 pages.

Office Action for CN Patent Application No. 201780021985.8, dated Apr. 2, 2020, 06 pages of Office Action and 7 pages of English Translation.

Office Action for EP Patent Application No. 17782263.2, dated May 12, 2020, 06 pages.

* cited by examiner

COMPOUND-EYE CAMERA MODULE AND ELECTRONIC DEVICE

CROSS REFERENCE TO RELATED APPLICATIONS

This application is a U.S. National Phase of International Patent Application No. PCT/JP2017/013510 filed on Mar. 31, 2017, which claims priority benefit of Japanese Patent Application No. JP 2016-082089 filed in the Japan Patent Office on Apr. 15, 2016. Each of the above-referenced applications is hereby incorporated herein by reference in its entirety.

TECHNICAL FIELD

The present technology relates to a compound-eye camera module and an electronic device, and more particularly to a compound-eye camera module and an electronic device in which a plurality of monocular camera modules can be fixed together by a connecting member more effectively.

BACKGROUND ART

A compound-eye type camera module is known in which a plurality of monocular camera modules is combined together (for example, see Patent Document 1).

CITATION LIST

Patent Document

Patent Document 1: Japanese Patent Application Laid-Open No. 2013-106229

SUMMARY OF THE INVENTION

Problems to be Solved by the Invention

Meanwhile, in a compound-eye type camera module, as a method of fixing a plurality of monocular camera modules, there is a method of fixing the monocular camera modules by using a connecting member having a predetermined shape.

By using such a connecting member, it is possible to fix the plurality of monocular camera modules together; however, at present, a fixing method using a connecting member has not been established, and it has been required to enable fixing the plurality of monocular camera modules together by the connecting member more effectively.

The present technology has been made in view of such a situation, and makes it possible to fix the plurality of monocular camera modules together by the connecting member more effectively.

Solutions to Problems

A compound-eye camera module of one aspect of the present technology includes: a plurality of monocular camera modules; and a connecting member that connects the plurality of monocular camera modules together, in which the plurality of monocular camera modules are connected together by fitting a camera-side positioning portion for positioning formed on a camera-side reference surface of each of the monocular camera modules and a member-side positioning portion for positioning formed on a member-side reference surface of the connecting member together.

An electronic device of one aspect of the present technology includes a compound-eye camera module including: a plurality of monocular camera modules; and a connecting member that connects the plurality of monocular camera modules together, in which the plurality of monocular camera modules are connected together by fitting a camera-side positioning portion for positioning formed on a camera-side reference surface of each of the monocular camera modules and a member-side positioning portion for positioning formed on a member-side reference surface of the connecting member together.

Note that, the compound-eye camera module or the electronic device of one aspect of the present technology may be an independent device, or an internal block constituting one device.

In one aspect of the present technology, the camera-side positioning portion for positioning formed on the camera-side reference surface in each of the monocular camera modules and the member-side positioning portion for positioning formed on the member-side reference surface in the connecting member are fitted together, whereby the plurality of monocular camera modules is connected together.

Effects of the Invention

According to one aspect of the present technology, the plurality of monocular camera modules can be fixed together by the connecting member more effectively.

Note that, the effects described herein are not necessarily limited, and may be any of the effects described in the present disclosure.

MODE FOR CARRYING OUT THE INVENTION

Figure 1A:
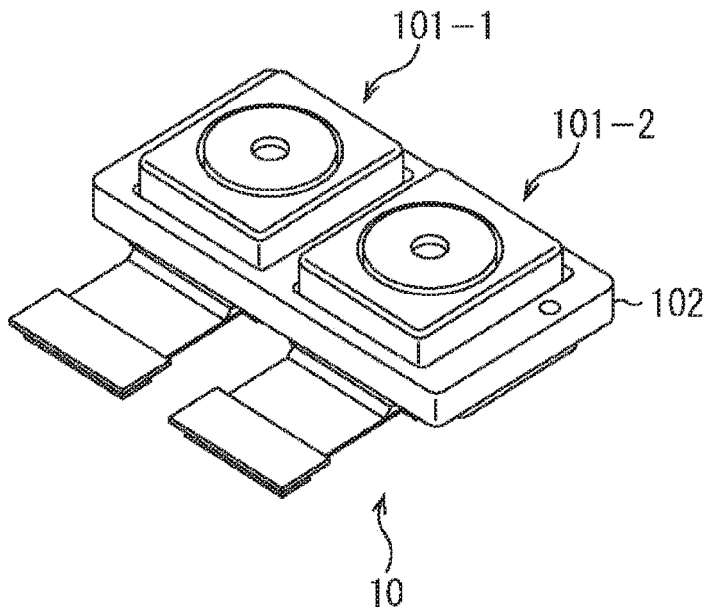
FIGS. 1A and 1B are diagrams illustrating a configuration example of an appearance of a compound-eye camera module.

Hereinafter, embodiments of the present technology will be described with reference to the drawings. Note that, the description will be made in the following order.

1. Configuration example of compound-eye camera module
2. Flow of manufacturing process of compound-eye camera module
   (1) Frame mounting process
   (2) Lens mounting process
   (3) Plate attaching process
   (4) Completion of compound-eye camera module
3. Modifications
4. Configuration example of electronic device
5. Usage example of compound-eye camera module
6. Application example to endoscopic surgical system
7. Application example to in-vivo information acquiring system
8. Application example to mobile body <1. Configuration Example of Compound-Eye Camera Module>

Figure 1B:
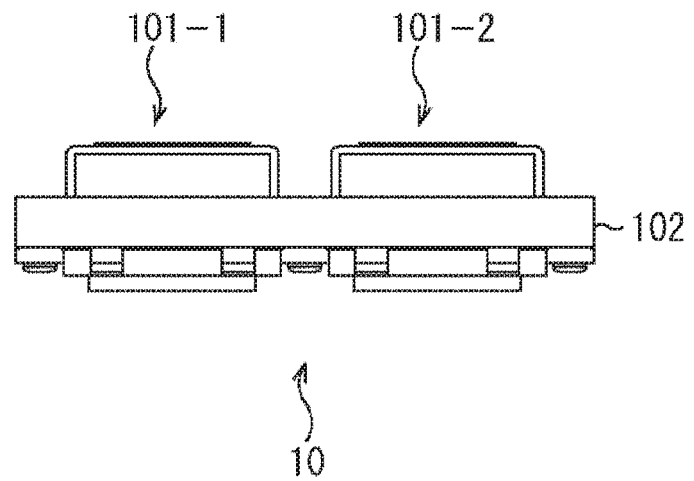

FIGS. 1A and 1B are diagrams illustrating a configuration example of an appearance of a compound-eye camera module to which the present technology is applied.

In FIGS. 1A and 1B, FIG. 1A is a perspective view of a compound-eye camera module 10, and FIG. 1B is a front view of the compound-eye camera module 10.

The compound-eye camera module 10 is a compound-eye type camera module, and includes a monocular camera module 101-1 and a monocular camera module 101-2 that are fixed together by a connecting member 102 having a rectangular plate shape.

On the monocular camera module 101-1, a solid-state image pickup element such as a complementary metal oxide semiconductor (CMOS) image sensor, a lens unit, and the like are mounted.

In the monocular camera module 101-1, the solid-state image pickup element includes a pixel unit in which a plurality of pixels is arrayed two-dimensionally, a peripheral circuit unit that performs, for example, drive of the pixels and analog/digital (A/D) conversion, and the like. In the solid-state image pickup element, an image is formed on a light receiving surface of the pixel unit by light (image light) entering from a lens in the lens unit, and the light of the image formed is photoelectrically converted, whereby a pixel signal is generated.

Similarly to the monocular camera module 101-1, on the monocular camera module 101-2, a CMOS image sensor, a lens unit, and the like are mounted. For example, in the compound-eye camera module 10, the monocular camera module 101-1 can be a main camera while the monocular camera module 101-2 can be a sub-camera.

The connecting member 102 has a rectangular plate shape having a contour larger than the size in the planar direction of when the lens unit of the monocular camera module 101-1 and the lens unit of the monocular camera module 101-2 are arranged side by side. Furthermore, in the connecting member 102, a rectangular insertion hole in which the lens unit of the monocular camera module 101-1 is inserted and a rectangular insertion hole in which the lens unit of the monocular camera module 101-2 is inserted are penetratingly formed symmetrically.

In the compound-eye camera module 10, the lens unit of the monocular camera module 101-1 and the lens unit of the monocular camera module 101-2 are inserted and fixed respectively in the two rectangular insertion holes penetratingly formed in the connecting member 102. As a result, the compound-eye camera module 10 is configured as a compound-eye type camera module including the monocular camera module 101-1 and the monocular camera module 101-2.

The compound-eye camera module 10 is configured as described above.

Note that, the monocular camera module 101-1 and the monocular camera module 101-2 are examples of a plurality of monocular camera modules connected together by the connecting member 102, and in a case where there is no particular need to distinguish them, the modules will be simply referred to as monocular camera modules 101.

Furthermore, the monocular camera module is a camera module on which one solid-state image pickup element (image sensor) is mounted. On the other hand, the compound-eye camera module is a camera module on which a plurality of solid-state image pickup elements (image sensors) is mounted by connecting the plurality of monocular camera modules together. However, modules may be referred to by other names such as packages.

<2. Flow of Manufacturing Process of Compound-Eye Camera Module>

Next, with reference to the flowchart of FIG. 2, an overall flow will be described of a manufacturing process of the compound-eye camera module 10 illustrated in FIGS. 1A and 1B.

In step S101, a frame mounting process is performed. In the frame mounting process, frames are attached to a plurality of sensor modules, respectively. Hereinafter, for convenience of explanation, a sensor module to which a frame is attached is also referred to as a frame-attached sensor module.

Note that, details of the frame mounting process will be described later with reference to FIGS. 3 to 5.

In step S102, a lens mounting process is performed. In the lens mounting process, lens units are respectively attached to the plurality of frame-attached sensor modules assembled in the frame mounting process (S101). Then, the frame-attached sensor modules to which the lens units are respectively attached correspond to the monocular camera module 101-1 (FIGS. 1A and 1B) and the monocular camera module 101-2 (FIGS. 1A and 1B) described above.

Note that, details of the lens mounting process will be described later with reference to FIGS. 6 and 7.

In step S103, a plate attaching process is performed. In the plate attaching process, the connecting member 102 is attached to the plurality of monocular camera modules 101 (101-1, 101-2) assembled in the lens mounting process (S102). As a result, as illustrated in FIGS. 1A and 1B, the monocular camera module 101-1 and the monocular camera module 101-2 are connected and fixed together by the connecting member 102, and the compound-eye camera module 10 is completed.

Note that, details of the plate attaching process will be described later with reference to FIGS. 8, 9A, 9B, 10A, and 10B.

The overall flow of the manufacturing process of the compound-eye camera module 10 has been described above. Next, details will be described of each process in the manufacturing process of the compound-eye camera module 10. However, in the manufacturing process, as an example, a case will be described where the compound-eye camera module 10 is manufactured by connecting the two monocular camera modules 101 (101-1, 101-2) together by the connecting member 102.

(1) Frame Mounting Process

First, with reference to FIGS. 3 to 5, the details will be described of the frame mounting process corresponding to step S101 of FIG. 2.

Figure 3:
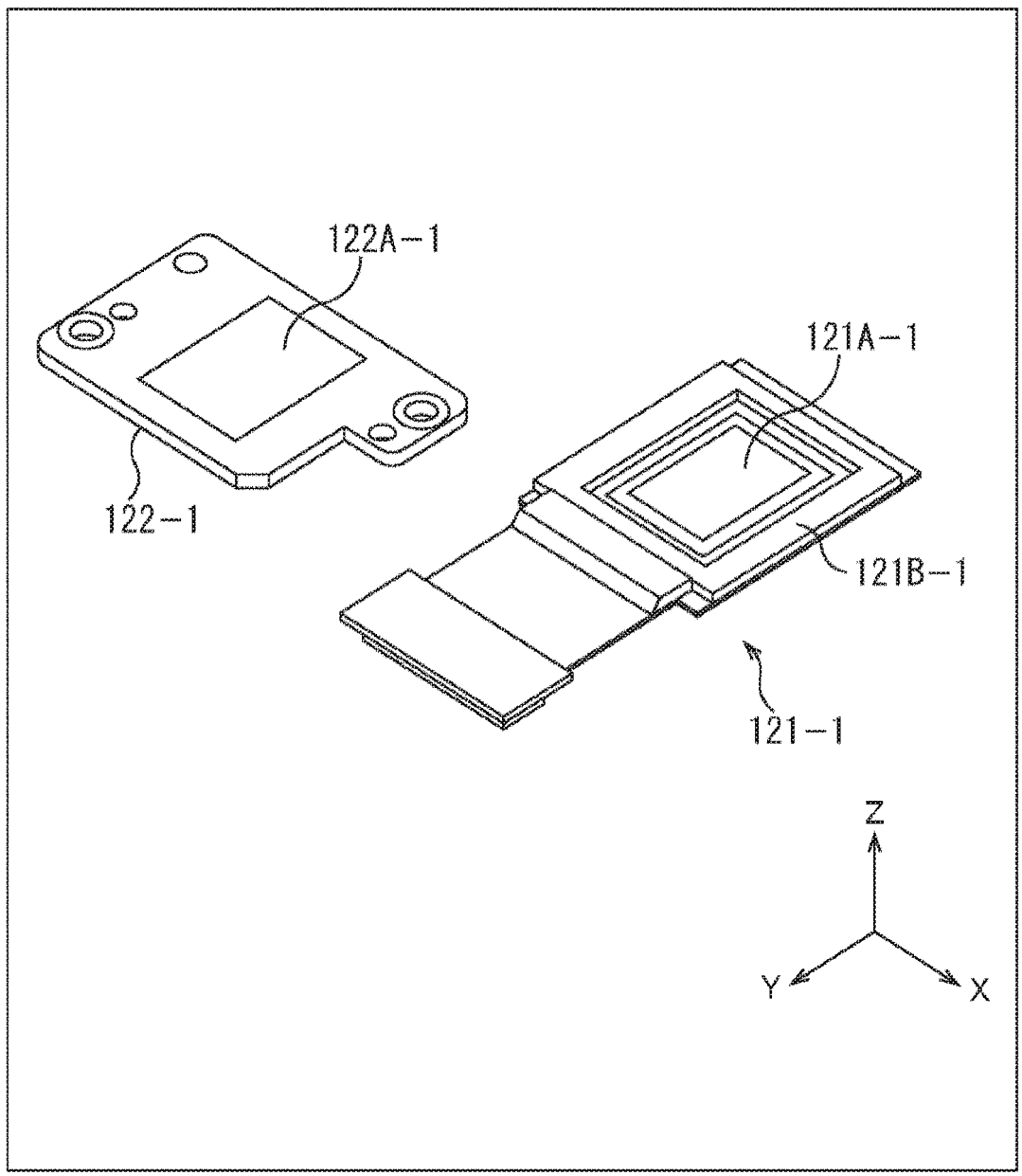
FIG. 3 is a diagram for explaining a frame mounting process.

FIG. 3 is a diagram for explaining the frame mounting process.

As illustrated in FIG. 3, in the frame mounting process, a sensor-corresponding surface 122A-1 of a frame 122-1 is adjusted with respect to a sensor surface 121A-1 of a sensor module 121-1, and then (a substrate 121B-1 of) the sensor module 121-1 and (a surface of a region other than the sensor-corresponding surface 122A-1 of) the frame 122-1 are fixed together by resin bonding or the like. Note that, the sensor-corresponding surface 122A-1 includes a member (transparent optical member) that can transmit light.

Here, the frame 122-1 is subjected to six-axis correction mounting with respect to the sensor module 121-1. In the six-axis correction mounting, correction is performed in directions of total of six axes including three axes of the X-axis, Y-axis, and Z-axis, the planar rotational direction θ, the X-axis tilt direction α, and the Y-axis tilt direction β so that the optical axis direction of the sensor-corresponding surface 122A-1 of the frame 122-1 matches an optical axis direction of the sensor surface 121A-1 of the sensor module 121-1. That is, it can also be said that alignment is performed in the optical axis direction here.

Figure 4:
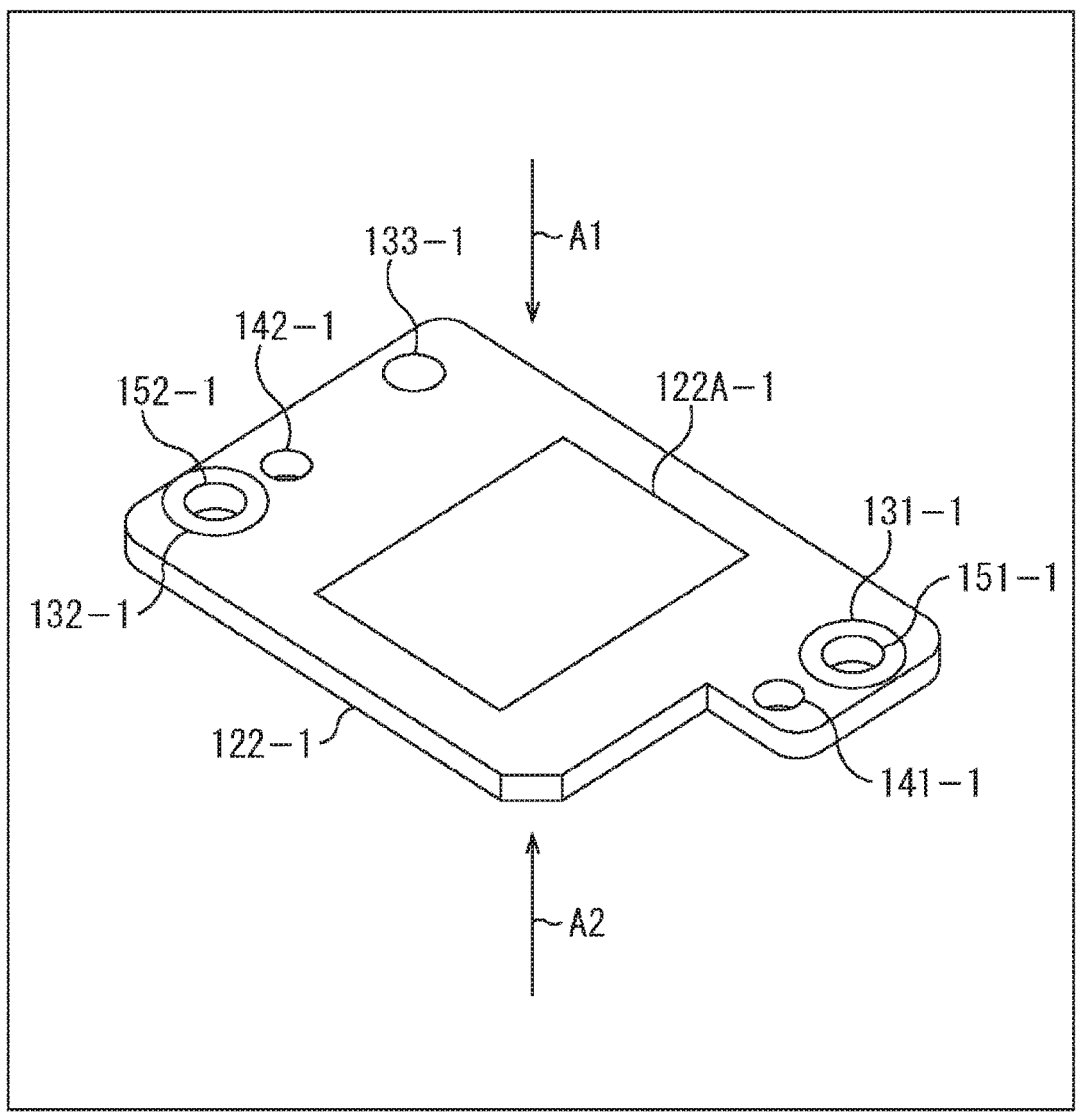
FIG. 4 is a diagram illustrating a detailed structure of a frame.

FIG. 4 illustrates a detailed structure of the frame 122-1 of FIG. 3. In FIG. 4, on the frame 122-1, reference marks 131-1 to 133-1 are formed indicating that the surface is a reference surface (camera-side reference surface) of when assembling with the connecting member 102 is performed in the plate attaching process (S103 of FIG. 2). In other words, in FIG. 4, among surfaces included in the frame 122-1, one surface of the frame 122-1 on the side indicated by an arrow A1 is set as the reference surface (camera-side reference surface). On the other hand, the other surface on the side indicated by an arrow A2 is not the reference surface.

Furthermore, in FIG. 4, in the frame 122-1, a positioning hole 141-1 and a positioning hole 142-1 are penetratingly formed that are portions for positioning (reference portions) of when assembling with the connecting member 102 is performed in the plate attaching process. However, the positioning hole 141-1 and the positioning hole 142-1 are preferably formed having a certain distance on the frame 122-1. Furthermore, in the frame 122-1, a screw insertion hole 151-1 and a screw insertion hole 152-1 are penetratingly formed for fixing the connecting member 102 by screws.

In FIG. 4, the frame 122-1 has a rectangular plate shape including a protruding region partially, and the positioning hole 141-1 and the screw insertion hole 151-1 are formed in the protruding region (portion). Furthermore, in the frame 122-1, the positioning hole 142-1 and the screw insertion hole 152-1 are formed in a region near the edge on the opposite side to the protruding region.

Note that, in the frame 122-1, the reference marks 131-1 to 133-1 are examples of a method of indicating that the surface on the side indicated by the arrow A1 is the reference surface, and if the reference surface can be recognized with another method, the reference marks are not necessarily provided.

Furthermore, in FIGS. 3 and 4, the case has been described where the frame 122-1 is attached to the sensor module 121-1; however, a frame 122-2 is attached to a sensor module 121-2 similarly. Here, the frame 122-2 has the same shape as the frame 122-1, and similarly to the frame 122-1, a positioning hole 141-2 and a positioning hole 142-2, and a screw insertion hole 151-2 and a screw insertion hole 152-2 are formed.

However, in a case where the frame 122-2 is attached to the sensor module 121-2, the attaching orientation is different from the case of the frame 122-1. In other words, the frame 122-2 has the same shape as the frame 122-1, but is attached to the sensor module 121-2 in a state in which the attaching orientation is rotated by 180 degrees on the XY plane with respect to the attaching orientation of the frame 122-1.

Figure 5:
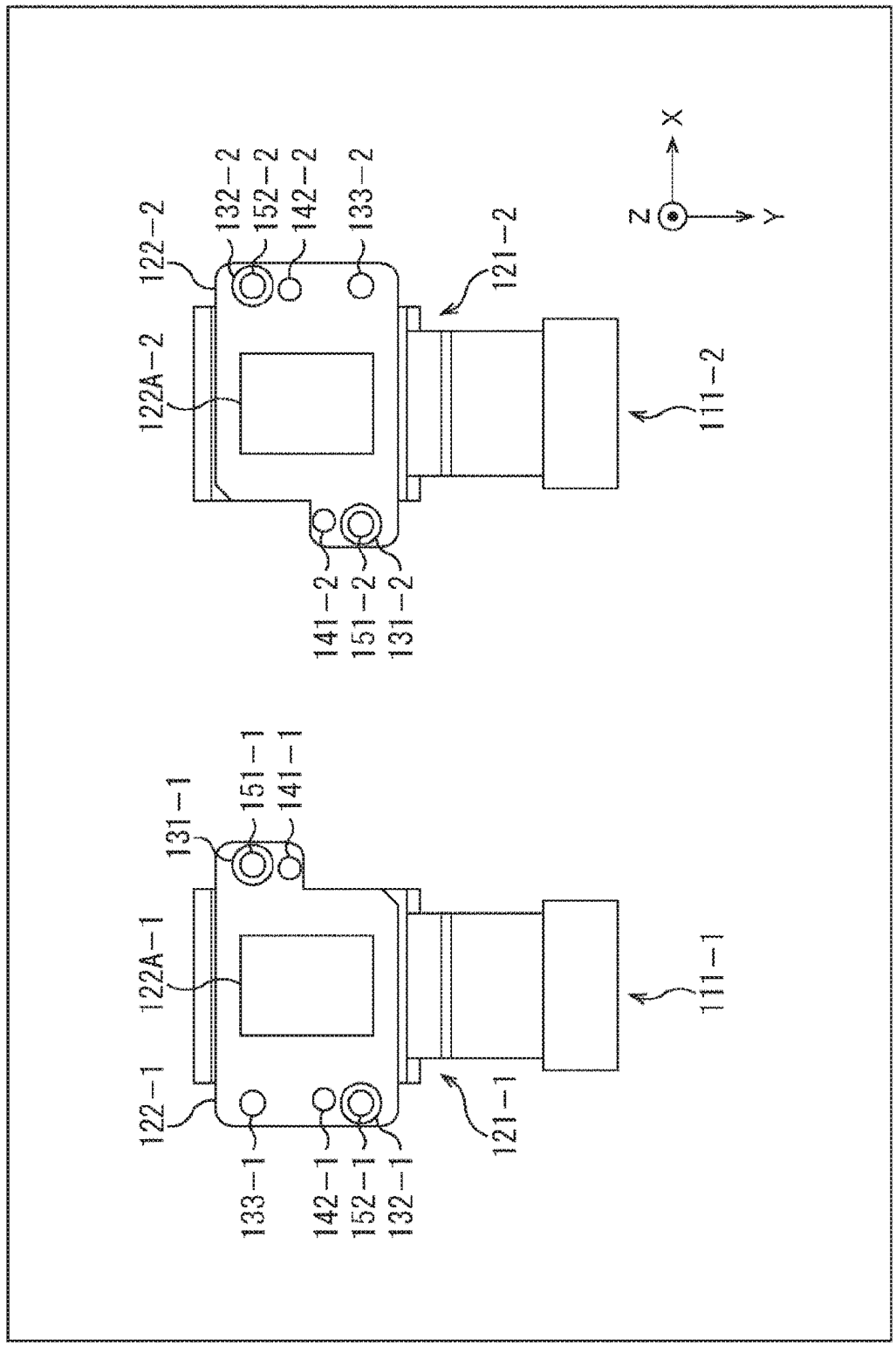
FIG. 5 is a diagram illustrating a structure of a sensor module after attachment of the frame.

Then, the frame 122-1 and the frame 122-2 are attached to the sensor module 121-1 and the sensor module 121-2, respectively, whereby a frame-attached sensor module 111-1 and a frame-attached sensor module 111-2 each are assembled, as illustrated in FIG. 5.

In FIG. 5, for the frame-attached sensor module 111-1, in the frame mounting process, to the sensor module 121-1, the frame 122-1 is mounted by the six-axis correction mounting, so that alignment in the optical axis direction is performed, and is fixed by resin bonding or the like. Similarly, for the frame-attached sensor module 111-2, to the sensor module 121-2, the frame 122-2 is mounted by the six-axis correction mounting, so that alignment in the optical axis direction is performed, and is fixed by resin bonding or the like.

However, in FIG. 5, in the frame 122-1 and the frame 122-2, the upper surface sides of FIG. 5 are the reference surfaces (camera-side reference surfaces), respectively. Furthermore, since the attaching orientations are different between the frame 122-1 and the frame 122-2 (when one frame is set as a reference, the other frame is rotated by 180 degrees on the XY plane), the protruding portion of the frame 122-1 and the protruding portion of the frame 122-2 can be combined together.

(2) Lens Mounting Process

Next, with reference to FIGS. 6 and 7, the details will be described of the lens mounting process corresponding to step S102 of FIG. 2.

Figure 6:
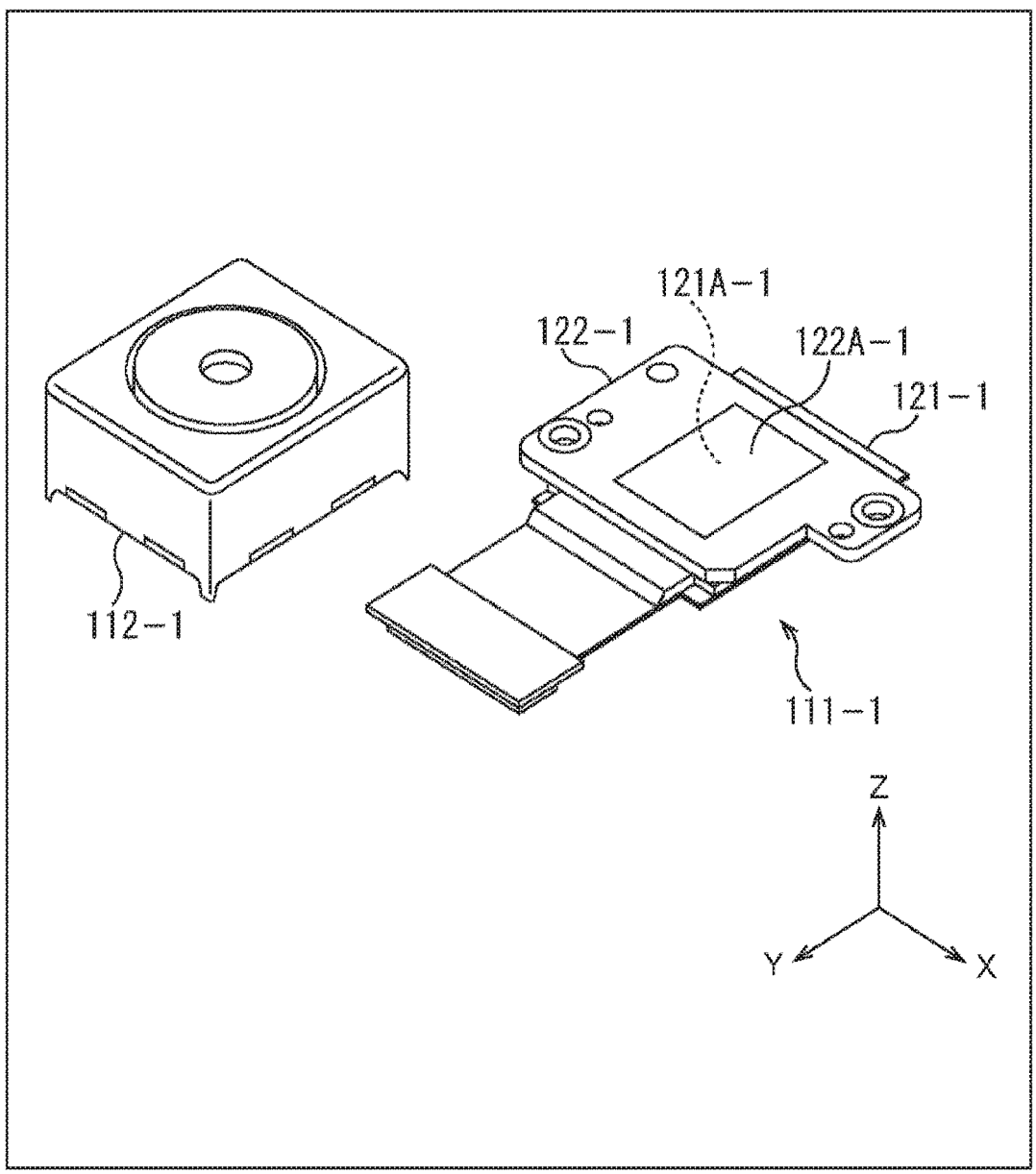
FIG. 6 is a diagram for explaining a lens mounting process.

FIG. 6 is a diagram for explaining the lens mounting process.

As illustrated in FIG. 6, in the lens mounting process, a lens unit 112-1 is adjusted with respect to the sensor surface 121A-1 of the frame-attached sensor module 111-1 (sensor module 121-1), and then (the surface of the region other than the sensor-corresponding surface 122A-1 of) the frame 122-1 and the lens unit 112-1 are fixed together by resin bonding or the like.

Here, the lens unit 112-1 is subjected to the six-axis correction mounting with respect to the frame-attached sensor module 111-1 (sensor module 121-1). In the six-axis correction mounting, correction is performed in directions of total of six axes including three axes of the X-axis, Y-axis, and Z-axis, the planar rotational direction θ, the X-axis tilt direction α, and the Y-axis tilt direction θ so that the optical axis direction of (the lens of) the lens unit 112-1 matches the optical axis direction of the sensor surface 121A-1 of the sensor module 121-1. That is, it can also be said that alignment is performed in the optical axis direction here.

Note that, in FIG. 6, a case is illustrated where the lens unit 112-1 is attached to the frame-attached sensor module 111-1; similarly, a lens unit 112-2 is attached to the frame attached sensor module 111-2.

Figure 7:
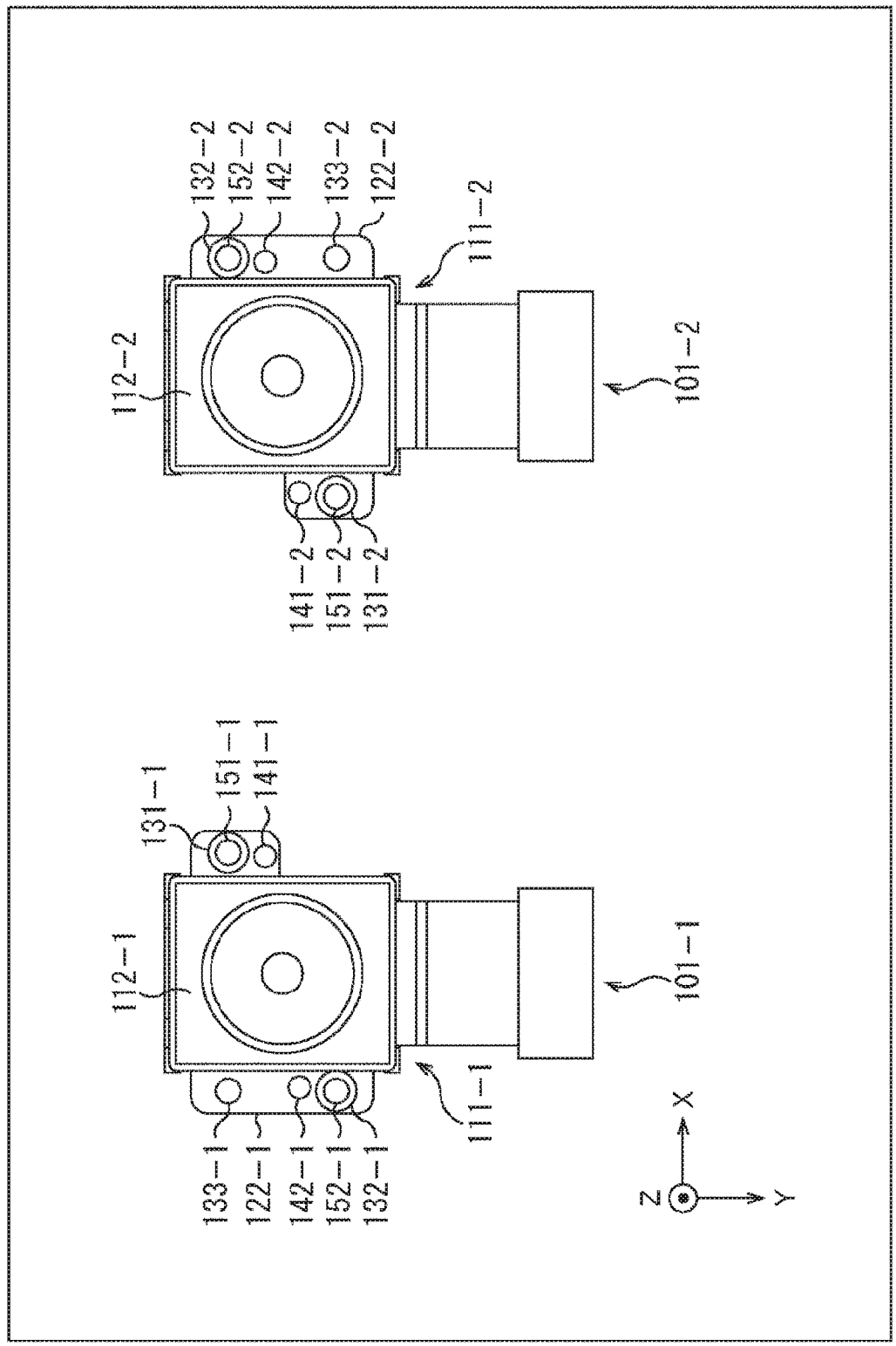
FIG. 7 is a diagram illustrating a structure of the sensor module after attachment of a lens unit.

Then, the lens unit 112-1 and the lens unit 112-2 are attached to the frame-attached sensor module 111-1 and the frame-attached sensor module 111-2, respectively, whereby the monocular camera module 101-1 and the monocular camera module 101-2 each are assembled, as illustrated in FIG. 7.

In FIG. 7, for the monocular camera module 101-1, in the lens mounting process, to the frame-attached sensor module 111-1, the lens unit 112-1 is mounted by the six-axis correction mounting, so that alignment in the optical axis direction is performed, and is fixed by resin bonding or the like. Similarly, for the monocular camera module 101-2, to the frame-attached sensor module 111-2, the lens unit 112-2 is mounted by the six-axis correction mounting, so that alignment in the optical axis direction is performed, and is fixed by resin bonding or the like.

However, in FIG. 7, in the frame 122-1 and the frame 122-2, the upper surface sides of FIG. 7 are the reference surfaces (camera-side reference surface), respectively.

Furthermore, the lens unit 112-1 and the lens unit 112-2 are attached to the sensor surface 121A-1 (sensor-corresponding surface 122A-1) and the sensor surface 121A-2 (sensor-corresponding surface 122A-2), respectively. Therefore, the lens unit 112-1 and the lens unit 112-2 do not cover the respective positioning holes 141 (141-1, 141-2), the positioning holes 142 (142-1, 142-2), the screw insertion holes 151 (151-1, 151-2), and the screw insertion holes 152 (152-1, 152-2) in the frame 122-1 and the frame 122-2.

(3) Plate Attaching Process

Finally, with reference to FIGS. 8, 9A, 9B, 10A, and 10B, the details will be described of the plate attaching process corresponding to step S103 of FIG. 2.

Figure 8:
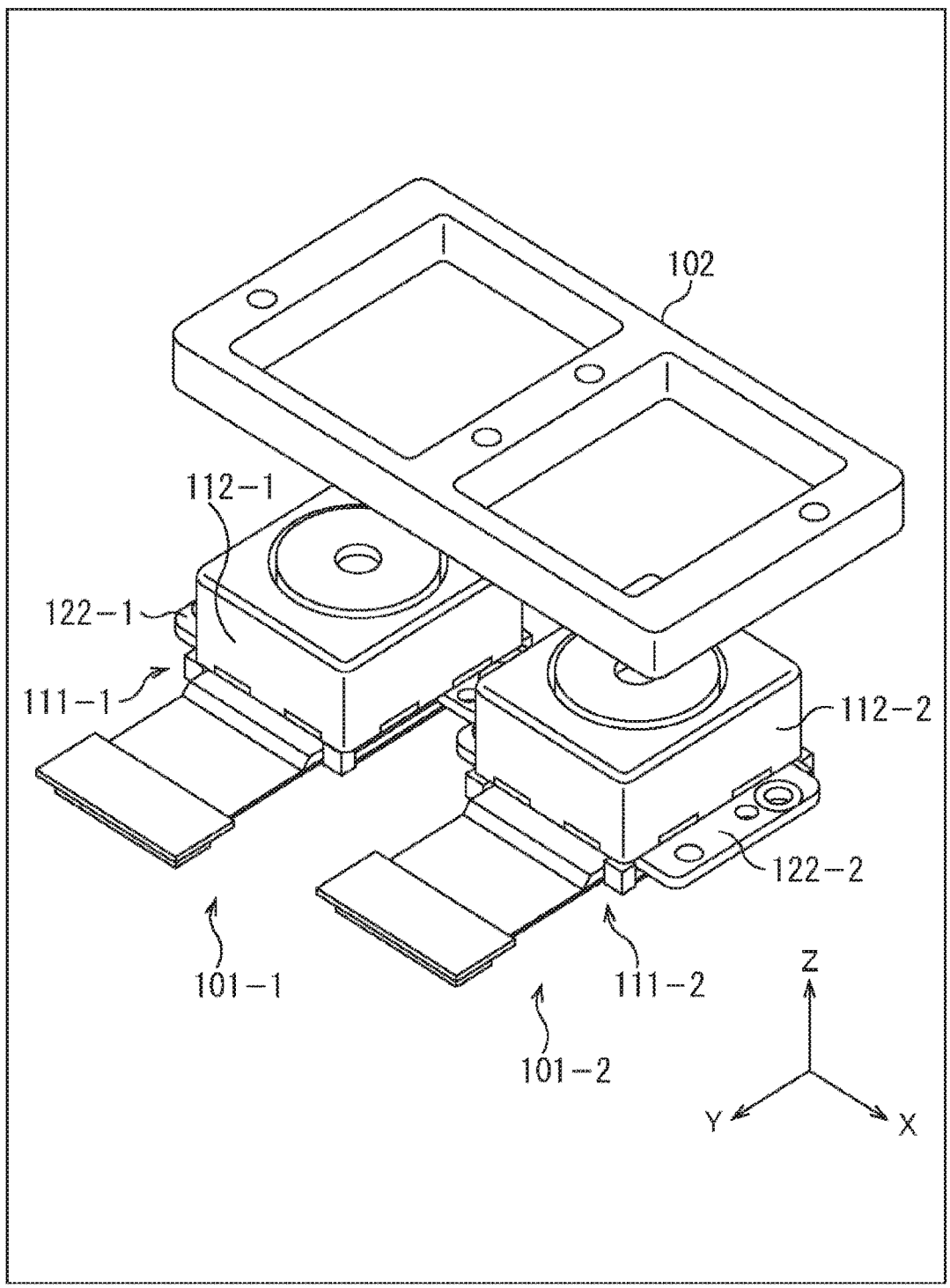
FIG. 8 is a diagram for explaining a plate attaching process.

FIG. 8 is a diagram for explaining the plate attaching process.

As illustrated in FIG. 8, in the plate attaching process, to the connecting member 102, the monocular camera module 101-1 and the monocular camera module 101-2 are attached from the lens unit 112-1 side and the lens unit 112-2 side (the sensor surface 121A-1 side and the sensor surface 121A-2 side), respectively.

Figure 9A:
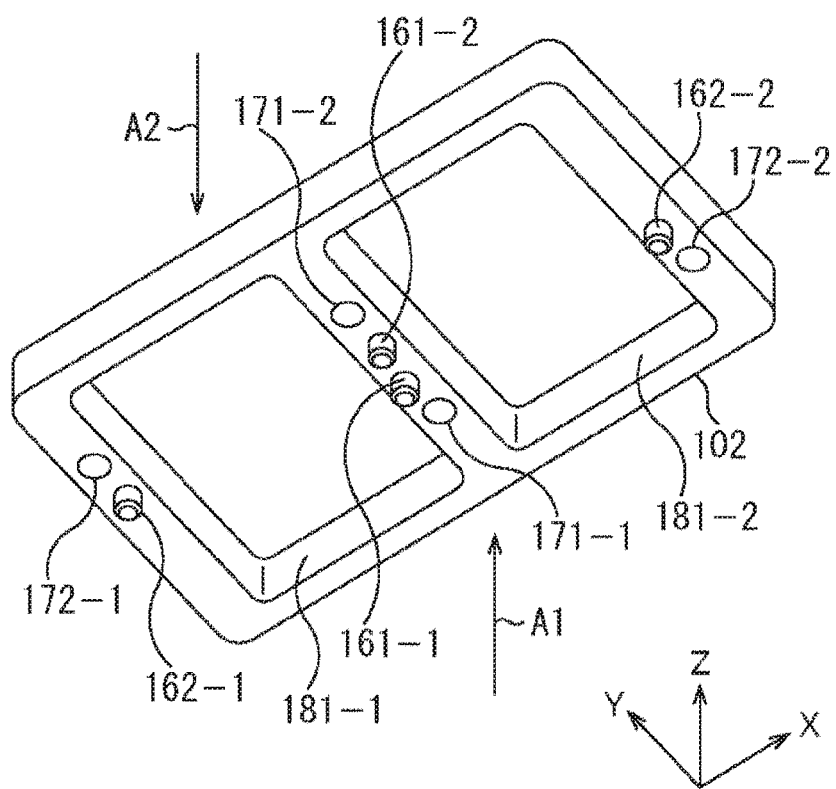
FIGS. 9A and 9B are diagrams illustrating a detailed structure of a connecting member.
Figure 9B:
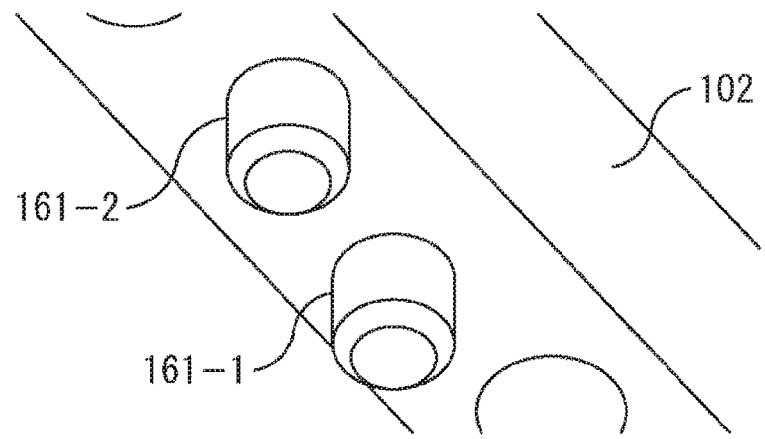

Here, FIGS. 9A and 9B illustrate a detailed structure of the connecting member 102 of FIG. 8. In FIG. 9A, in the connecting member 102, positioning protrusions 161-1 and 161-2, and positioning protrusions 162-1 and 162-2 are formed on a reference surface (member-side reference surface) side of when assembling with the frame 122-1 and the frame 122-2 is performed. Furthermore, in the connecting member 102, screw insertion holes 171-1 and 171-2 and screw insertion holes 172-1 and 172-2 are formed for fixing the frame 122-1 and the frame 122-2 by In other words, in FIG. 9A, among the surfaces included in the connecting member 102, one surface on a side indicated by an arrow A1, on which the positioning protrusions 161 (161-1, 161-2) and the positioning protrusions 162 (162-1, 162-2) are formed, is set as a reference surface (member-side reference surface). On the other hand, the other surface on the side indicated by an arrow A2 is not the reference surface.

The positioning protrusions 161-1 and 161-2, and the positioning protrusions 162-1 and 162-2 are portions for positioning (reference portions) of when assembling of the connecting member 102, (the frame 122-1 of) the monocular camera module 101-1, and (the frame 122-2 of) the monocular camera module 101-2 is performed.

FIG. 9B is an enlarged view of the periphery of the positioning protrusion 161-1 and the positioning protrusion 161-2 that is a part of the connecting member 102 of FIG. 9A. As illustrated in FIG. 9B, the positioning protrusion 161-1 and the positioning protrusion 161-2 each have a columnar shape.

Referring back to FIG. 9A, the connecting member 102 is a member for connecting (the frame 122-1 of) the monocular camera module 101-1 and (the frame 122-2 of) the monocular camera module 101-2 together, and has a rectangular plate shape having a contour larger than the size of when the lens unit 112-1 and the lens unit 112-2 are arranged side by side in the XY plane direction.

Furthermore, in the connecting member 102, a rectangular insertion hole 181-1 having a rectangular shape in which the lens unit 112-1 of the monocular camera module 101-1 is inserted, and a rectangular insertion hole 181-2 having a rectangular shape in which the lens unit 112-2 of the monocular camera module 101-2 is inserted are penetratingly formed. Note that, in the connecting member 102, the rectangular insertion hole 181-1 and the rectangular insertion hole 181-2 are symmetrically formed.

Then, in the connecting member 102, the positioning protrusion 161-1 and the positioning protrusion 162-1 are formed having corresponding shapes, at positions respectively corresponding to the positioning hole 141-1 (FIG. 7) and the positioning hole 142-1 (FIG. 7) formed in the frame 122-1 (FIG. 7) of the monocular camera module 101-1 having the lens unit 112-1 inserted in the rectangular insertion hole 181-1 during assembling.

Furthermore, the positioning protrusion 161-2 and the positioning protrusion 162-2 are formed having corresponding shapes, at positions respectively corresponding to the positioning hole 141-2 (FIG. 7) and the positioning hole 142-2 (FIG. 7) formed in the frame 122-2 (FIG. 7) of the monocular camera module 101-2 having the lens unit 112-2 inserted in the rectangular insertion hole 181-2 during assembling.

In other words, the shape of the protrusion in each of the positioning protrusions (161-1, 162-1, 161-2, 162-2) formed in the connecting member 102 (FIG. 9A), and the shape of the hole in each of the positioning holes (141-1, 142-1, 141-2, 142-2) formed in the frame 122-1 (FIG. 7) and the frame 122-2 (FIG. 7) have a corresponding shape, for example, a columnar shape and the like.

Therefore, during assembling in the plate attaching process, in a state where the reference surface (member-side reference surface) in the connecting member 102 and the reference surface (camera-side reference surface) in the frame 122-1 face each other in the optical axis direction, (the lens unit 112-1 of) the monocular camera module 101-1 is inserted in the rectangular insertion hole 181-1, whereby the positioning protrusion 161-1 and the positioning protrusion 162-1 of the connecting member 102 are respectively inserted in the positioning hole 141-1 and the positioning hole 142-1 of the frame 122-1.

Similarly, during assembling in the plate attaching process, in a state where the reference surface (member-side reference surface) in the connecting member 102 and the reference surface (camera-side reference surface) in the frame 122-2 face each other in the optical axis direction, (the lens unit 112-2 of) the monocular camera module 101-2 is inserted in the rectangular insertion hole 181-2, whereby the positioning protrusion 161-2 and the positioning protrusion 162-2 of the connecting member 102 are respectively inserted in the positioning hole 141-2 and the positioning hole 142-2 of the frame 122-2.

As described above, the positioning during assembling in the plate attaching process is performed, and the reference surface (member-side reference surface) of the connecting member 102 and the reference surfaces (camera-side reference surfaces) of the frame 122-1 and the frame 122-2 are fixed together to be in contact with each other, whereby the monocular camera module 101-1 and the monocular camera module 101-2 are connected together by the connecting member 102. As a result, as illustrated in FIGS. 10A and 10B, the compound-eye camera module 10 is assembled.

Figure 10A:
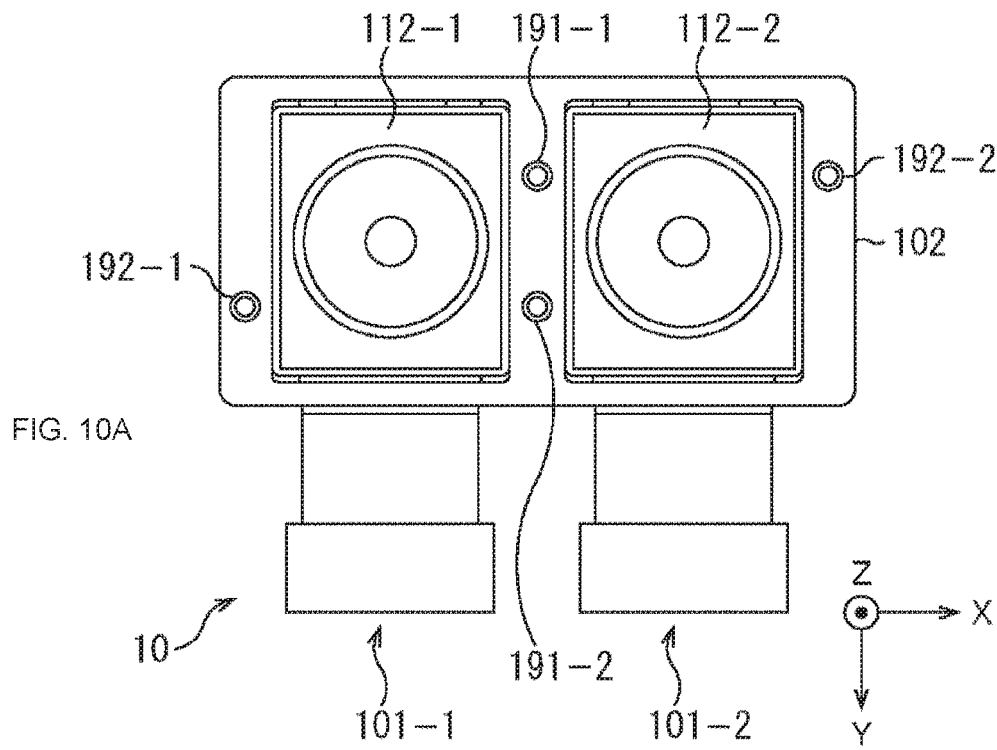
FIGS. 10A and 10B are diagrams illustrating a structure of a monocular camera module after attachment of the connecting member.
Figure 10B:
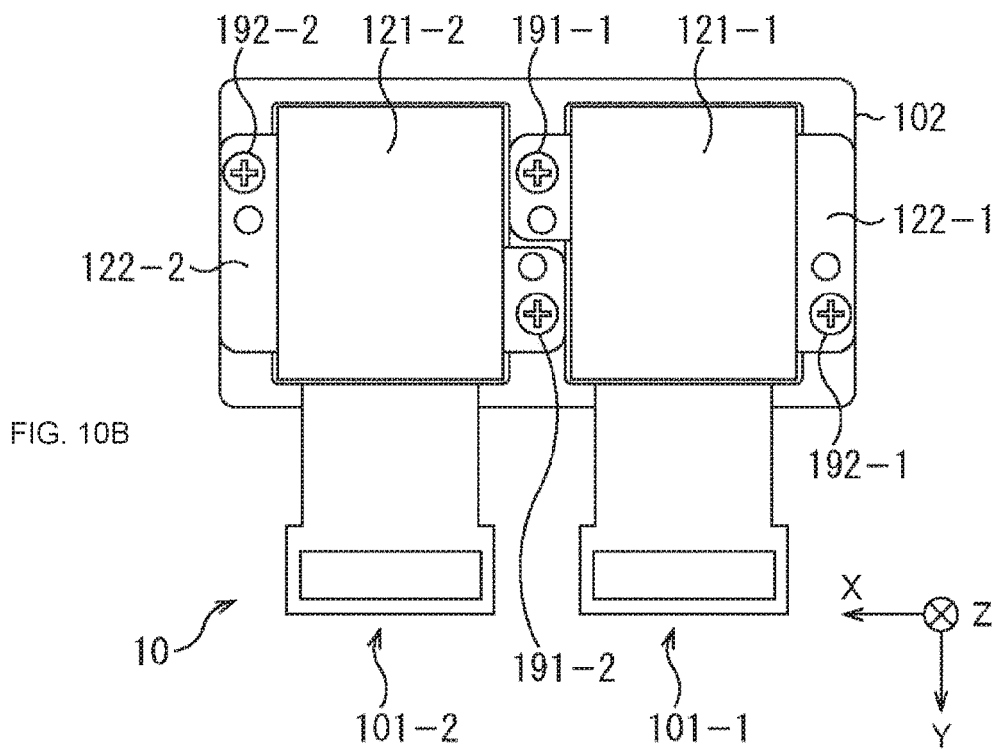

In FIGS. 10A and 10B, FIG. 10A is a plan view of the compound-eye camera module 10, and FIG. 10B is a bottom view of the compound-eye camera module 10. As illustrated in FIGS. 10A and 10B, the connecting member 102, the frame 122-1 of the monocular camera module 101-1, and the frame 122-2 of the monocular camera module 101-2 are screwed and fixed together by using screws 191-1 and 191-2, and screws 192-1 and 192-2.

In other words, during assembling in the plate attaching process, when the positioning protrusion 161-1 and the positioning protrusion 162-1 of the connecting member 102 are respectively inserted in the positioning hole 141-1 and the positioning hole 142-1 of the frame 122-1, and the positioning is completed, the screw insertion hole 171-1 and the screw insertion hole 172-1 of the connecting member 102 respectively overlap with the screw insertion hole 151-1 and the screw insertion hole 152-1 of the frame 122-1, and the corresponding screw insertion holes are connected together.

More specifically, the reference surface (member-side reference surface) of the connecting member 102 and the reference surface (camera-side reference surface) of the frame 122-1 are positioned and brought into contact with each other, whereby the screw insertion hole 171-1 of the connecting member 102 and the screw insertion hole 151-1 of the frame 122-1 are connected together, and a screw hole is formed. Then, the screw 191-1 can be screwed into the screw hole (screw insertion holes 171-1, 151-1).

Similarly, the screw 192-1 can be screwed into a screw hole formed by the screw insertion hole 172-1 of the connecting member 102 and the screw insertion hole 152-1 of the frame 122-1 together. Furthermore, a screw 191-2 can be screwed into a screw hole formed by connecting the screw insertion hole 171-2 of the connecting member 102 and the screw insertion hole 151-2 of the frame 122-2 together. Similarly, the screw 192-2 can be screwed into a screw hole formed by connecting the screw insertion hole 172-2 of the connecting member 102 and the screw insertion hole 152-2 of the frame 122-2 together.

As described above, the connecting member 102 and the frame 122-1 are fixed together by the screw 191-1 and the screw 192-1, and the connecting member 102 and the frame 122-2 are fixed together by the screw 191-2 and the screw 192-2, whereby the monocular camera module 101-1 and the monocular camera module 101-2 are fixed to the connecting member 102, and the compound-eye camera module 10 is completed.

(4) Completion of Compound-Eye Camera Module

Figure 11A:
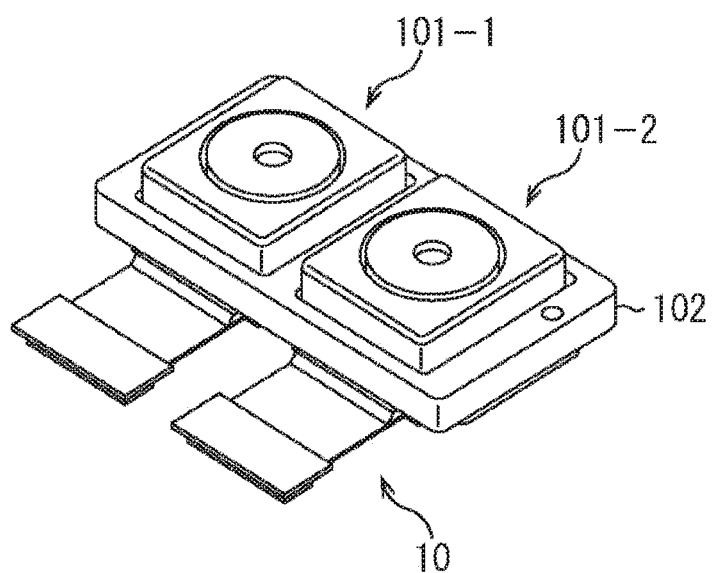
FIGS. 11A, 11B, and 11C are diagrams illustrating a structure of the compound-eye camera module after completion.
Figure 11B:
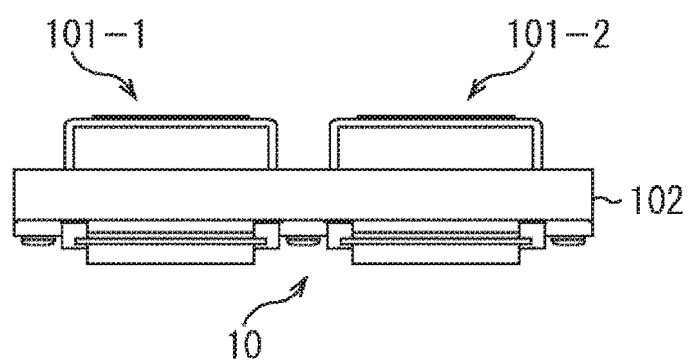
Figure 11C:
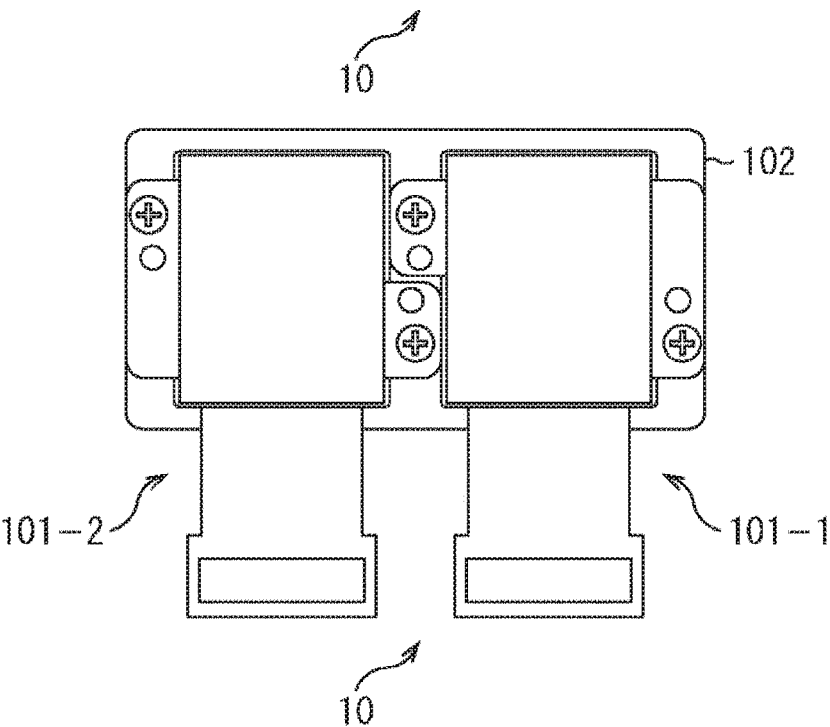

FIGS. 11A, 11B, and 11C are diagrams illustrating a structure of the compound-eye camera module 10 after completion.

In FIGS. 11A, 11B, and 11C, FIG. 11A is a perspective view of the compound-eye camera module 10, FIG. 11B is a front view of the compound-eye camera module 10, and FIG. 11C is a bottom view of the compound-eye camera module 10.

Figure 2:
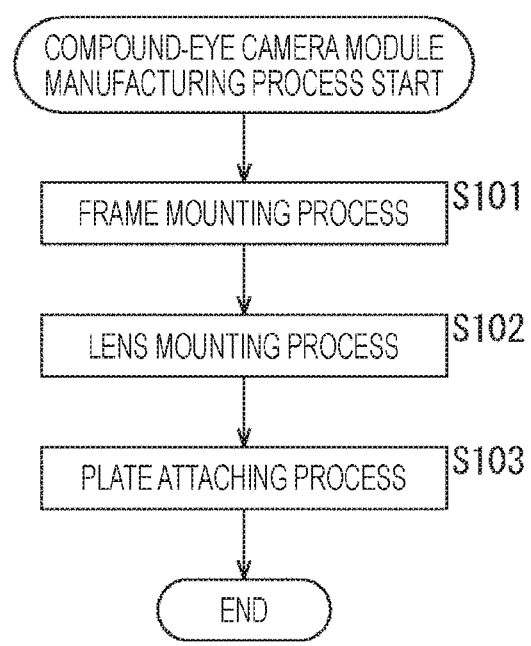
FIG. 2 is a flowchart for explaining an overall flow of a manufacturing process of the compound-eye camera module.

In the compound-eye camera module 10 manufactured in the above-described manufacturing process (FIG. 2), for the monocular camera module 101-1 and the monocular camera module 101-2 connected together by the connecting member 102, the optical axis direction is aligned in the frame mounting process (S101 of FIG. 2) and the lens mounting process (S102 of FIG. 2). Therefore, in the plate attaching process (S103 of FIG. 2), it is sufficient that the portions for positioning of the reference surfaces (the camera-side reference surface and the member-side reference surface) are fitted and fixed together without performing compound eye adjustment having a high degree of difficulty, and a process of forming compound eyes (compound eye adjustment) can be simplified.

Here, for example, in a conventional compound-eye camera module, in a case where two monocular camera modules are connected together, it is necessary to perform the compound eye adjustment having a high degree of difficulty such as adjusting a position of an image generated by one monocular camera module with respect to a position of an image generated by the other monocular camera module, and time and effort have been required.

On the other hand, in the compound-eye camera module 10 of FIGS. 11A 11B, and 11C, the monocular camera modules 101 (101-1, 101-2) whose optical axis directions are aligned can be fixed to the connecting member 102 to be parallel to the reference surface by the portions for positioning of the reference surfaces (the camera-side reference surface and the member-side reference surface), so that there is no need to perform the compound eye adjustment that has been conventionally performed. In other words, since such positioning (mechanical positioning) can be performed with high accuracy, compound eye adjustment is unnecessary, and as a result, the process of forming compound eyes can be simplified. Furthermore, since the process of forming compound eyes is simplified as described above, the process of forming compound eyes can be performed not only on the side where the camera module is manufactured but also on the side where the camera module is purchased.

Furthermore, in the compound-eye camera module 10 of FIGS. 11A 11B and 11C, the frames 122 (122-1, 122-2) and the connecting member 102 are fixed together by a detachable fixing method such as screwing during assembling in the plate attaching process, whereby it is unnecessary to interpose an adhesive at a fixing interface, and repairability can be improved. Particularly, in the conventional compound-eye camera module, improvement of repairability is required in a case where the monocular camera modules are connected together by the connecting member; however, in the compound-eye camera module 10 of FIGS. 11A, 11B, and 11C, the requirement can be satisfied.

Moreover, in the compound-eye camera module 10 of FIGS. 11A, 11B, and 11C, it is unnecessary to interpose the adhesive at the fixing interface between the frames 122 (122-1, 122-2) and the connecting member 102, so that fluctuations can also be suppressed in compound eye accuracy due to deterioration of an adhesive resin. Particularly, in the conventional compound-eye camera module, in a case where fixing is performed with the adhesive resin, aged deterioration of compound eye accuracy is large, and maintaining is required of the compound eye accuracy; however, in the compound-eye camera module 10 of FIGS. 11A, 11B, and 11C, the requirement can be satisfied.

Furthermore, in the compound-eye camera module 10 of FIGS. 11A 11B and 11C, the monocular camera module 101-1 and the monocular camera module 101-2 are connected together by the connecting member 102, whereby a heat dissipation route can be newly secured in a region close to each of the monocular camera modules 101 by the connecting member 102, and heat dissipation can be improved. Particularly, in the conventional compound-eye camera module (monocular camera module), improvement in heat dissipation is required; however, in the compound-eye camera module 10 of FIGS. 11A, 11B, and 11C, the requirement can be satisfied.

Furthermore, in the compound-eye camera module 10 of FIGS. 11A 11B and 11C, the connecting member 102 may be formed not as a single member but as a part of a housing, in the housing (so-called set housing) that houses the compound-eye camera module 10. In a case where such a structure is adopted, there is no need to prepare the connecting member 102 by itself, so that there is an advantage that the number of parts can be reduced.

Moreover, in the compound-eye camera module 10 of FIGS. 11A, 11B, and 11C, since the monocular camera modules 101 (101-1, 101-2) are fixed to the rectangular insertion holes 181 (181-1, 181-2) penetratingly formed in the connecting member 102, the height (height in the Z-axis direction) of the compound-eye camera module 10 can be made equivalent (substantially the same) to the monocular camera modules 101 (101-1, 101-2). That is, when the plurality of monocular camera modules 101 is connected together by the connecting member 102 to manufacture the compound-eye camera module 10, the total height of the camera module does not rise.

Moreover, in the compound-eye camera module 10 of FIGS. 11A, 11B, and 11C, it is possible to freely adjust a distance (base line length) between the monocular camera module 101-1 and the monocular camera module 101-2 depending on the shape of the connecting member 102, so that the degree of freedom of design can be improved.

Furthermore, the compound-eye camera module 10 of FIGS. 11A ,11B, and 11C is not configured as a dedicated compound-eye camera module but configured such that the plurality of monocular camera modules 101 is connected together by the connecting member 102, so that it can be selected whether the module is configured as the compound-eye camera module 10, or the monocular camera module 101. Moreover, in the compound-eye camera module 10 of FIGS. 11A, 11B, and 11C, by providing the connecting member 102 with a predetermined angle, it can be used for applications of a wide view, a wide angle, and the like, for example.

As described above, the compound-eye camera module 10 manufactured by the above-described manufacturing process (FIG. 2) has a more advantageous effect as compared with the conventional compound-eye camera module and the like, and in the compound-eye camera module 10, it can be said that the plurality of monocular camera modules 101 can be fixed together by the connecting member 102 more effectively.

<3. Modifications>

In the above description, the compound-eye camera module 10 has been described as configured by connecting the two monocular camera modules of the monocular camera module 101-1 and the monocular camera module 101-2 together by the connecting member 102; however, the number of monocular camera modules is not limited to two, and three or more monocular camera modules may be connected together. For example, in a case where three or more monocular camera modules are connected together, rectangular insertion holes are formed in the connecting member 102 depending on the number of monocular camera modules, whereby the monocular camera modules can be fixed in the rectangular insertion holes, respectively.

Furthermore, in the above description, the case has been described where the two positioning holes (141-1, 142-1) are formed on the reference surface (camera-side reference surface) of the frame 122-1, and the two positioning holes (141-2, 142-2) are formed on the reference surface (camera-side reference surface) of the frame 122-2, while the four positioning protrusions (161-1, 162-1, 161-2, 162-2) are formed on the reference surface (member-side reference surface) of the connecting member 102.

For these positioning holes and the positioning protrusions, if the shapes and positions of the holes and protrusions to be combined together correspond to each other at the time of positioning during assembling, for example, shapes other than the columnar shape may be used (for example, a recess or the like that is not penetratingly formed), or another form may be adopted such as forming the holes and protrusions at other positions on the reference surface. Furthermore, the number of positioning holes formed on the reference surface (camera-side reference surface) and the number of positioning protrusions formed on the reference surface (member-side reference surface) only need to correspond to each other between the camera-side reference surface side and the member-side reference surface side, and the number can be arbitrary. Moreover, contrary to the above description, for example, the positioning protrusions may be formed on the reference surface (camera-side reference surface) of the frames 122, while the positioning holes may be formed on the reference surface (member-side reference surface) of the connecting member 102.

Furthermore, in the compound-eye camera module 10, the positions at which the frame 122-1 and the frame 122-2 and the connecting member 102 are screwed to each other are also arbitrary, and depending on the screwing positions, the screw insertion holes (151-1, 152-1, 151-2, 152-2) on the frames 122 sides and the screw insertion holes (171-1, 172-1, 171-2, 172-2) on the connecting member 102 side are formed. Furthermore, the method of fixing the frame 122-1 and the frame 122-2 and the connecting member 102 together in the compound-eye camera module 10 is not limited to screwing, and another fixing method can be adopted, for example, a fixing method using a tape or a dismantling resin, and the like, as long as the frames 122 and the connecting member 102 are detachable from each other in the method.

Furthermore, in the above description, the rectangular insertion holes corresponding to the number of monocular camera modules are formed in the connecting member 102, and the monocular camera modules are fixed in the rectangular insertion holes; however, the number of the monocular camera modules and the number of the rectangular insertion holes do not necessarily have to coincide with each other. For example, only one rectangular insertion hole may be formed in the connecting member 102, and the monocular camera module 101-1 and the monocular camera module 101-2 may be fixed in the one rectangular insertion hole. Moreover, in the above description, the monocular camera module 101-1 and the monocular camera module 101-2 have been described as having the same shape; however, the monocular camera modules 101-1 and 101-2 may have different shapes. In that case, for example, the shape and the like of the rectangular insertion hole formed in the connecting member 102 can be changed. Furthermore, in the above description, the connecting member 102 has been described as having a rectangular plate shape; however, the shape of the connecting member 102 may be a shape other than the rectangular shape. For example, one or a plurality of protrusions having a trapezoidal shape, a semicircular shape, or the like can be provided on the connecting member 102 having a rectangular plate shape.

Furthermore, in the above description, the connecting member 102 has been attached from the lens unit 112 side (image pickup surface side) of the monocular camera module 101 in the plate attaching process; however, the connecting member 102 may be attached to the monocular camera module 101 from a direction other than the image pickup surface side. For example, the connecting member 102 can be attached from the bottom surface side of the monocular camera module 101. Moreover, on the reference surface (member-side reference surface) of the connecting member 102, a reference mark may be formed indicating that the surface is a reference surface of when assembling with the frame 122-1 and the frame 122-2 is performed. However, for example, in the connecting member 102, if the reference surface (member-side reference surface) can be recognized with the positioning protrusion 161-1 or the like, the reference mark is not necessarily provided. Similarly, in the frames 122-1 and 122-2, if the reference surface (camera-side reference surface) can be recognized with some method, the reference mark is not necessarily provided.

<4. Configuration Example of Electronic Device>

Figure 12:
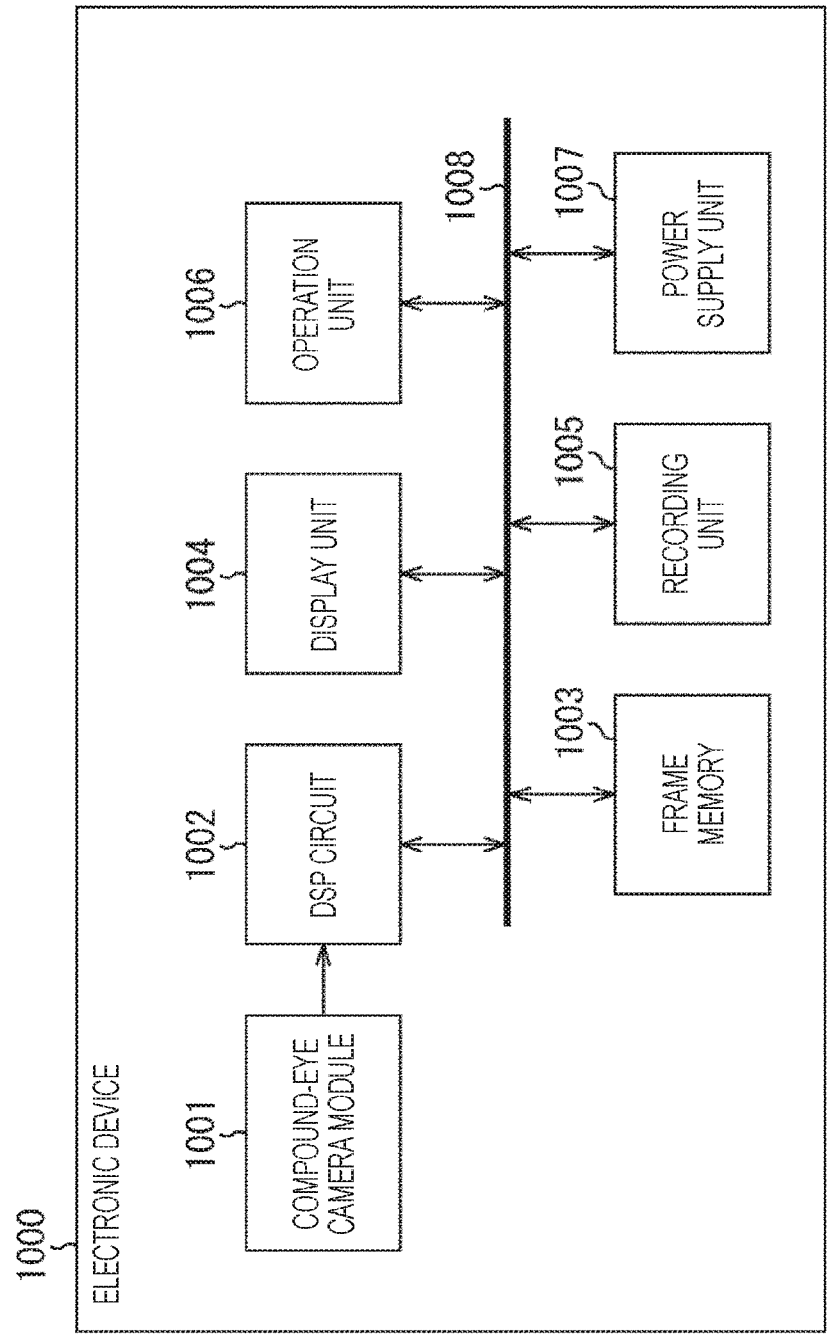
FIG. 12 is a diagram illustrating a configuration example of an electronic device.

FIG. 12 is a diagram illustrating a configuration example of an electronic device including a solid-state image pickup device.

An electronic device 1000 of FIG. 12 is, for example, an electronic device, such as an image pickup device such as a digital still camera or a video camera, or a mobile terminal device having an image pickup function, such as a smartphone or a tablet terminal.

In FIG. 12, the electronic device 1000 includes a compound-eye camera module 1001, a digital signal processor (DSP) circuit 1002, a frame memory 1003, a display unit 1004, a recording unit 1005, an operation unit 1006, and a power supply unit 1007. Furthermore, in the electronic device 1000, the DSP circuit 1002, the frame memory 1003, the display unit 1004, the recording unit 1005, the operation unit 1006, and the power supply unit 1007 are connected to each other via a bus line 1008.

The compound-eye camera module 1001 corresponds to the above-described compound-eye camera module 10 (FIGS. 1A, 1B, 11A, 11B, 11C, and the like), and, for example, has a structure in which the monocular camera module 101-1 and the monocular camera module 101-2 are connected together by the connecting member 102.

The DSP circuit 1002 is a signal processing circuit that processes a signal supplied from the compound-eye camera module 1001. The DSP circuit 1002 outputs image data obtained by processing the signal from the compound-eye camera module 1001. The frame memory 1003 temporarily holds the image data processed by the DSP circuit 1002 for each frame.

The display unit 1004 includes, for example, a panel type display device such as a liquid crystal panel or an organic electro-luminescence (EL) panel, and displays a moving image or a still image captured by the compound-eye camera module 1001. The recording unit 1005 records the image data of the moving image or the still image captured by the compound-eye camera module 1001 in a recording medium such as a semiconductor memory or a hard disk.

The operation unit 1006 outputs operation commands for various functions of the electronic device 1000, in accordance with operation by a user. The power supply unit 1007 supplies various power sources being operation power sources for the DSP circuit 1002, the frame memory 1003, the display unit 1004, the recording unit 1005, and the operation unit 1006, to these supply targets as appropriate.

The electronic device 1000 is configured as described above.

<5. Usage Example of Compound-Eye Camera Module>

Figure 13:
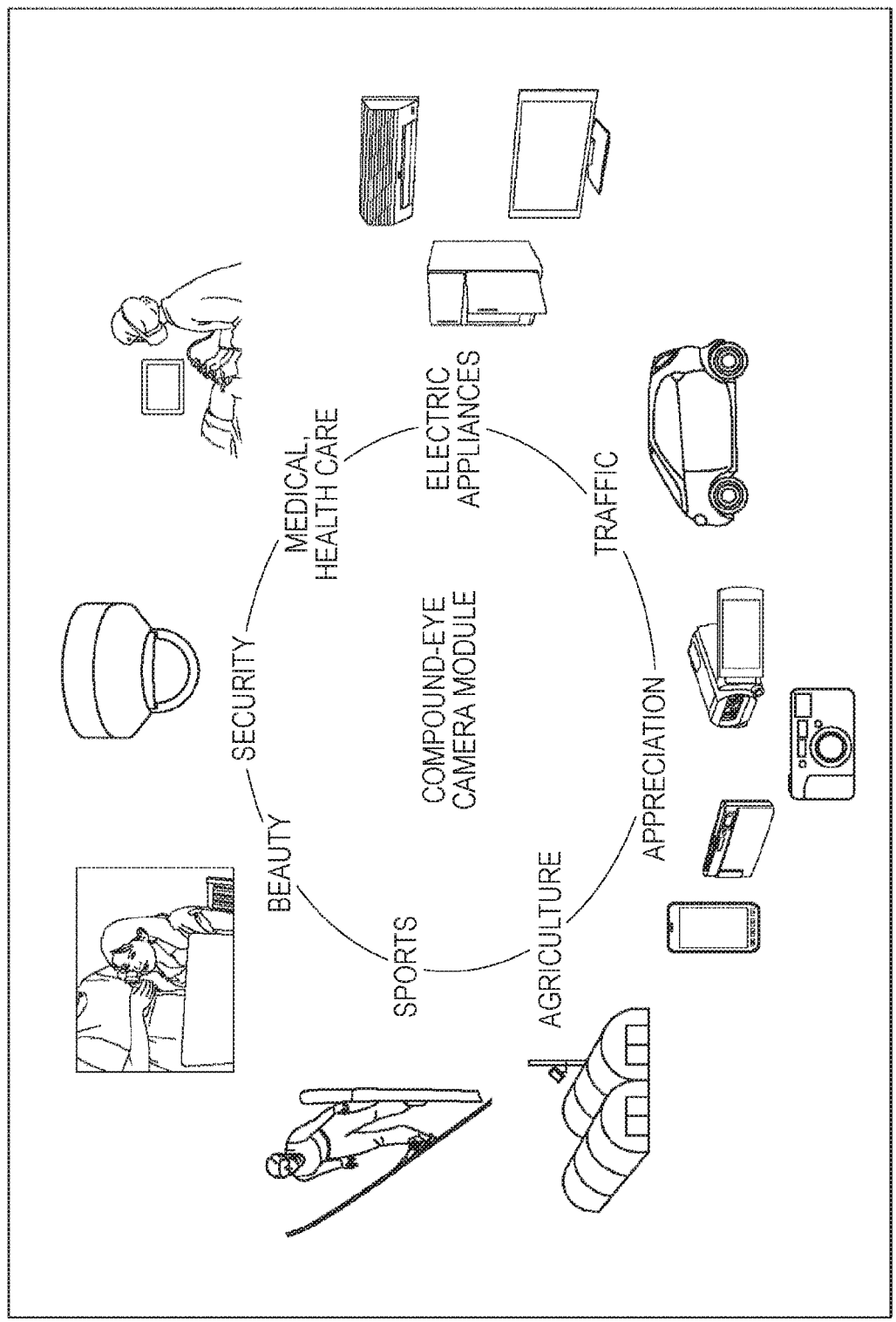
FIG. 13 is a diagram illustrating a usage example of the compound-eye camera module.

FIG. 13 is a diagram illustrating a usage example of the compound-eye camera module 10.

The compound-eye camera module 10 (FIGS. 1A and 1B or 11A and 11B) described above may be used for various cases of sensing light, for example, visible light, infrared light, ultraviolet light, X-rays, or the like, as described below. In other words, as illustrated in FIG. 13, not only in a field of appreciation in which an image to be used for appreciation is photographed as described above, also in a device used in a field, for example, a field of traffic, a field of home electric appliances, a field of medical and health care, a field of security, a field of beauty, a field of sports, a field of agriculture, or the like, the compound-eye camera module 10 can be used.

Specifically, as described above, in the field of appreciation, the compound-eye camera module 10 can be used in a device (for example, the electronic device 1000 of FIG. 12) for photographing the image to be used for appreciation such as a digital camera, a smartphone, a cellular phone with a camera function, and the like.

In the field of traffic, for example, the compound-eye camera module 10 can be used in devices to be used for traffic, such as an automotive sensor for photographing ahead of, behind, around, inside, and the like of the car, a monitoring camera for monitoring traveling vehicles and roads, and a distance sensor for measuring a distance between vehicles and the like, for safe driving such as automatic stop, and recognition of driver's condition or the like.

In the field of home electric appliances, for example, the compound-eye camera module 10 can be used in devices to be used for home electric appliances, such as a television receiver, a refrigerator, and an air conditioner, for photographing a user's gesture and performing device operation in accordance with the gesture. Furthermore, in the field of medical and healthcare, the compound-eye camera module 10 can be used in devices to be used for medical and health care, for example, an endoscope, a device for performing angiography by receiving infrared light, and the like.

In the field of security, for example, the compound-eye camera module 10 can be used in devices to be used for security, such as a monitoring camera for crime prevention, and a camera for person authentication. Furthermore, in the field of beauty, for example, the compound-eye camera module 10 can be used in devices for beauty, such as a skin measuring instrument for photographing skin, and a microscope for photographing a scalp.

In the field of sports, for example, the compound-eye camera module 10 can be used in devices to be used for sports, such as an action camera for sports application or the like, and a wearable camera. Furthermore, in the field of agriculture, for example, the compound-eye camera module 10 can be used in devices to be used for agriculture, such as a camera for monitoring conditions of fields and crops.

<6. Application Example to Endoscopic Surgical System>

The present technology according to the present disclosure can be applied to various products. For example, the present technology according to the present disclosure may be applied to an endoscopic surgical system.

Figure 14:
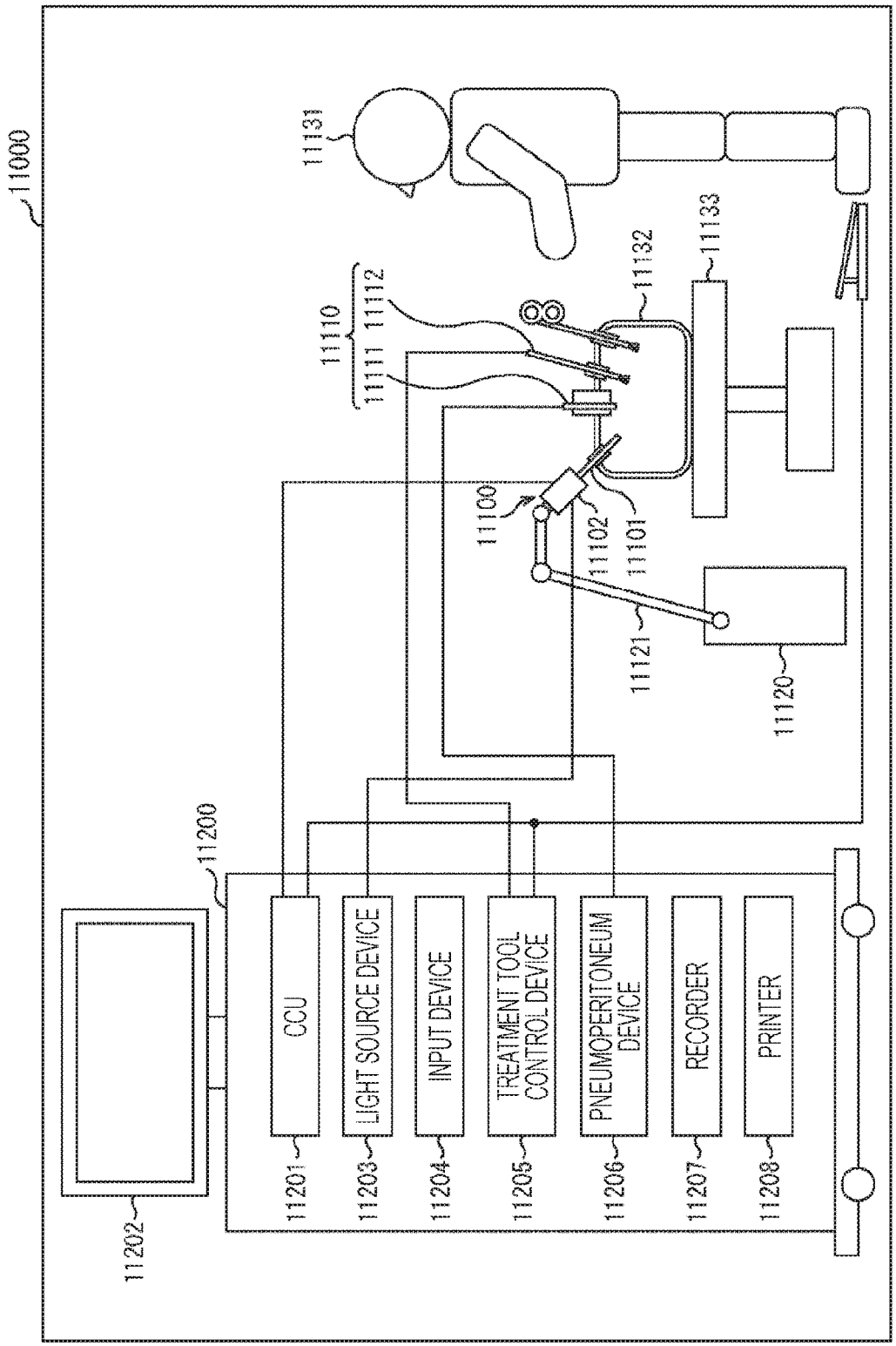
FIG. 14 is a diagram illustrating an example of a schematic configuration of an endoscopic surgical system.

FIG. 14 is a diagram illustrating an example of a schematic configuration of the endoscopic surgical system to which the present technology according to the present disclosure can be applied.

FIG. 14 illustrates a state in which an operator (doctor) 11131 is performing surgery on a patient 11132 on a patient bed 11133 using an endoscopic surgical system 11000. As illustrated, the endoscopic surgical system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 in which a region of a predetermined length from the distal end is inserted into the body cavity of the patient 11132, and a camera head 11102 connected to the proximal end of the lens barrel 11101. In the illustrated example, the endoscope 11100 formed as a so-called rigid scope including a rigid lens barrel 11101 is illustrated, but the endoscope 11100 may be formed as a so-called flexible scope including a flexible lens barrel.

At the distal end of the lens barrel 11101, an opening is provided into which an objective lens is fitted. A light source device 11203 is connected to the endoscope 11100, and light generated by the light source device 11203 is guided to the distal end of the lens barrel by a light guide extending inside the lens barrel 11101, and the light is emitted toward an observation target in the body cavity of the patient 11132 via the objective lens. Note that, the endoscope 11100 may be a direct viewing scope, an oblique viewing scope, or a side viewing scope.

An optical system and an image pickup element are provided inside the camera head 11102, and reflected light (observation light) from the observation target is converged on the image pickup element by the optical system. The observation light is photoelectrically converted by the image pickup element, and an electric signal corresponding to the observation light, that is, an image signal corresponding to the observation image is generated. The image signal is transmitted as RAW data to a camera control unit (CCU) 11201.

The CCU 11201 includes a central processing unit (CPU), a graphics processing unit (GPU), and the like, and comprehensively controls operation of the endoscope 11100 and a display device 11202. Moreover, the CCU 11201 receives the image signal from the camera head 11102 and applies various types of image processing to the image signal, for example, development processing (demosaic processing), and the like, for displaying the image based on the image signal.

The display device 11202 displays an image based on the image signal subjected to the image processing by the CCU 11201, by the control from the CCU 11201.

The light source device 11203 includes a light source, for example, a light emitting diode (LED) or the like, and supplies irradiation light for photographing a surgical portion or the like to the endoscope 11100.

An input device 11204 is an input interface to the endoscopic surgical system 11000. A user can input various types of information and instructions to the endoscopic surgical system 11000 via the input device 11204. For example, the user inputs an instruction or the like to change image pickup conditions (type of irradiation light, magnification, focal length, and the like) for the endoscope 11100.

A treatment tool control device 11205 controls drive of the energy treatment tool 11112 for cauterization of tissue, incision, sealing of blood vessels, or the like. A pneumoperitoneum device 11206 injects a gas into the body cavity via the pneumoperitoneum tube 11111 to inflate the body cavity of the patient 11132, for the purpose of securing a visual field by the endoscope 11100 and securing a working space of the operator. A recorder 11207 is a device capable of recording various types of information on surgery. A printer 11208 is a device capable of printing various types of information regarding surgery in various formats such as text, image, graph, and the like.

Note that, the light source device 11203 that supplies irradiation light for photographing a surgical portion to the endoscope 11100 can include a white light source including, for example, an LED, a laser light source, or a combination thereof. In a case where the white light source includes a combination of R, G, and B laser light sources, the output intensity and the output timing of each color (each wavelength) can be controlled with high accuracy, so that adjustment can be performed of the white balance of the captured image in the light source device 11203. Furthermore, in this case, it is also possible to capture an image corresponding to each of R, G, and B in time division by emitting the laser light from each of the R, G, and B laser light sources in time division to the observation target, and controlling drive of the image pickup element of the camera head 11102 in synchronization with the emission timing. According to this method, a color image can be obtained without providing a color filter in the image pickup element.

Furthermore, drive of the light source device 11203 may be controlled such that the intensity of light to be output is changed at predetermined time intervals. By controlling the drive of the image pickup element of the camera head 11102 in synchronization with the timing of the light intensity change to acquire images in time division, and synthesizing the images, a high dynamic range image can be generated without so-called blocked up shadows or blown out highlights.

Furthermore, the light source device 11203 may be configured to be able to supply light of a predetermined wavelength band corresponding to special light observation. In the special light observation, for example, by using wavelength dependence of light absorption in body tissue, by emitting narrow band light compared to irradiation light (in other words, white light) at the time of ordinary observation, so-called Narrow Band Imaging is performed in which a predetermined tissue such as a blood vessel in a mucosal surface layer is photographed with high contrast. Alternatively, in the special light observation, fluorescence observation may be performed that obtain an image by fluorescence generated by emitting excitation light. In the fluorescence observation, it is possible to irradiate body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 11203 can be configured to be able to supply narrow band light and/or excitation light corresponding to such special light observation.

Figure 15:
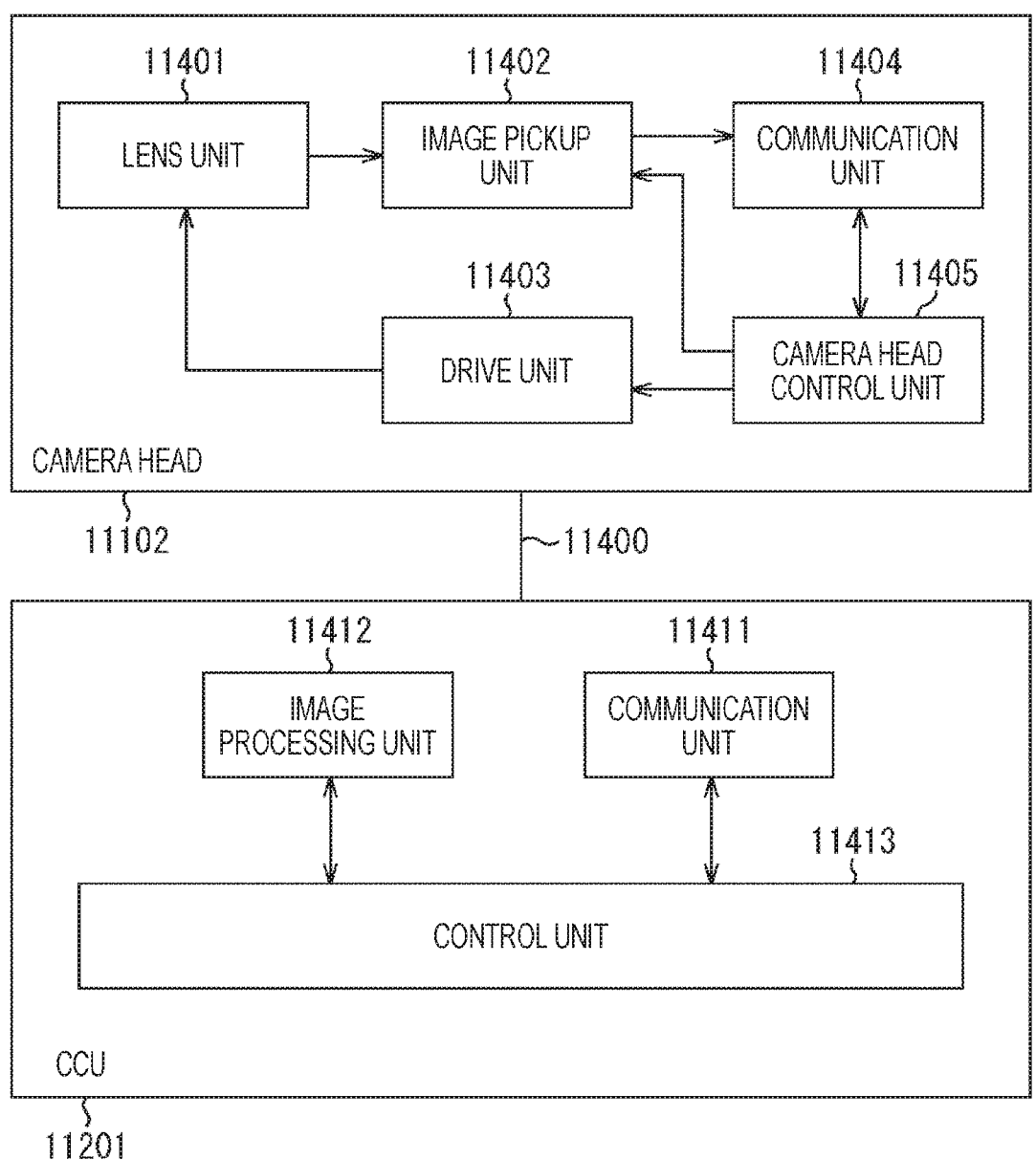
FIG. 15 is a block diagram illustrating an example of a functional configuration of a camera head and a CCU.

FIG. 15 is a block diagram illustrating an example of a functional configuration of the camera head 11102 and the CCU 11201 illustrated in FIG. 14.

The camera head 11102 includes a lens unit 11401, an image pickup unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. The observation light taken in from the distal end of the lens barrel 11101 is guided to the camera head 11102 and is incident on the lens unit 11401. The lens unit 11401 includes a combination of a plurality of lenses including a zoom lens and a focus lens.

The image pickup unit 11402 includes an image pickup element. The image pickup element constituting the image pickup unit 11402 may be one (so-called single plate type) element, or a plurality of (so-called multiple plate type) elements. In a case where the image pickup unit 11402 includes the multiple plate type, for example, image signals corresponding to R, G, and B may be generated by respective image pickup elements, and a color image may be obtained by synthesizing the image signals. Alternatively, the image pickup unit 11402 may include a pair of image pickup elements for acquiring right-eye and left-eye image signals corresponding to three-dimensional (3D) display. By performing the 3D display, the operator 11131 can grasp the depth of living tissue in a surgical portion more accurately. Note that, in a case where the image pickup unit 11402 includes the multiple plate type, a plurality of systems of the lens units 11401 can be provided corresponding to respective image pickup elements.

Furthermore, the image pickup unit 11402 is not necessarily provided in the camera head 11102. For example, the image pickup unit 11402 may be provided inside the lens barrel 11101 immediately after the objective lens.

The drive unit 11403 includes an actuator and moves the zoom lens and the focus lens of the lens unit 11401 by a predetermined distance along the optical axis by control of the camera head control unit 11405. As a result, the magnification and the focus of the captured image by the image pickup unit 11402 can be appropriately adjusted.

The communication unit 11404 includes a communication device for transmitting/receiving various types of information to/from the CCU 11201. The communication unit 11404 transmits the image signal obtained from the image pickup unit 11402 as RAW data to the CCU 11201 via the transmission cable 11400.

Furthermore, the communication unit 11404 receives a control signal for controlling drive of the camera head 11102 from the CCU 11201, and supplies the control signal to the camera head control unit 11405. The control signal includes information regarding image pickup conditions, for example, information that specifies the frame rate of the captured image, information that specifies the exposure value at the time of image pickup, and/or information that specifies the magnification and focus of the captured image.

Note that, the image pickup conditions such as the frame rate, exposure value, magnification, and focus may be appropriately specified by the user, or automatically set by the control unit 11413 of the CCU 11201 on the basis of the acquired image signal. In the latter case, the so-called auto exposure (AE) function, auto focus (AF) function, and auto white balance (AWB) function are installed in the endoscope 11100.

The camera head control unit 11405 controls the drive of the camera head 11102 on the basis of the control signal from the CCU 11201 received via the communication unit 11404.

The communication unit 11411 includes a communication device for transmitting/receiving various types of information to/from the camera head 11102. The communication unit 11411 receives the image signal transmitted from the camera head 11102 via the transmission cable 11400.

Furthermore, the communication unit 11411 transmits the control signal for controlling the drive of the camera head 11102 to the camera head 11102. The image signal and the control signal can be transmitted by electrical communication, optical communication, or the like.

The image processing unit 11412 performs various types of image processing on the image signal that is RAW data transmitted from the camera head 11102.

The control unit 11413 performs various types of control related to image pickup of a surgical portion or the like by the endoscope 11100 and display of the captured image obtained by the image pickup of the surgical portion or the like. For example, the control unit 11413 generates the control signal for controlling the drive of the camera head 11102.

Furthermore, the control unit 11413 causes the display device 11202 to display the captured image of the surgical portion or the like on the basis of the image signal subjected to the image processing by the image processing unit 11412. At this time, the control unit 11413 may recognize various objects in the captured image by using various image recognition technologies. For example, the control unit 11413 detects color, a shape of an edge, and the like of the object included in the captured image, thereby being able to recognize a surgical tool such as a forceps, a specific body part, bleeding, mist at the time of using the energy treatment tool 11112, or the like. When causing the display device 11202 to display the captured image, the control unit 11413 may cause the display device 11202 to superimpose and display various types of surgery assistance information on the image of the surgical portion by using the recognition result. The surgery assistance information is superimposed and displayed, and presented to the operator 11131, whereby the burden on the operator 11131 can be reduced, and the operator 11131 can reliably perform surgery.

The transmission cable 11400 connecting the camera head 11102 and the CCU 11201 together is an electric signal cable adaptable to communication of electric signals, an optical fiber adaptable to optical communication, or a composite cable thereof.

Here, in the illustrated example, communication is performed by wire using the transmission cable 11400; however, communication between the camera head 11102 and the CCU 11201 may be performed wirelessly.

In the above, an example has been described of the endoscopic surgical system to which the technology according to the present disclosure can be applied. The technology according to the present disclosure can be applied to the endoscope 11100, (the image pickup unit 11402 of) the camera head 11102, (the image processing unit 11412 of) the CCU 11201, and the like) in the above-described configuration. Specifically, the compound-eye camera module 10 of FIGS. 1A and 1B can be applied to an image pickup unit 10402. By applying the technology according to the present disclosure to the image pickup unit 10402, for example, fluctuations are suppressed in compound eye accuracy, and a sharper image of a surgical portion can be obtained, so that the operator can reliably confirm the surgical portion.

Note that, although the endoscopic surgical system has been described as an example here, the technology according to the present disclosure may be applied to other applications, for example, a microscopic surgery system, and the like.

<7. Application Example to In-Vivo Information Acquiring System>

Figure 16:
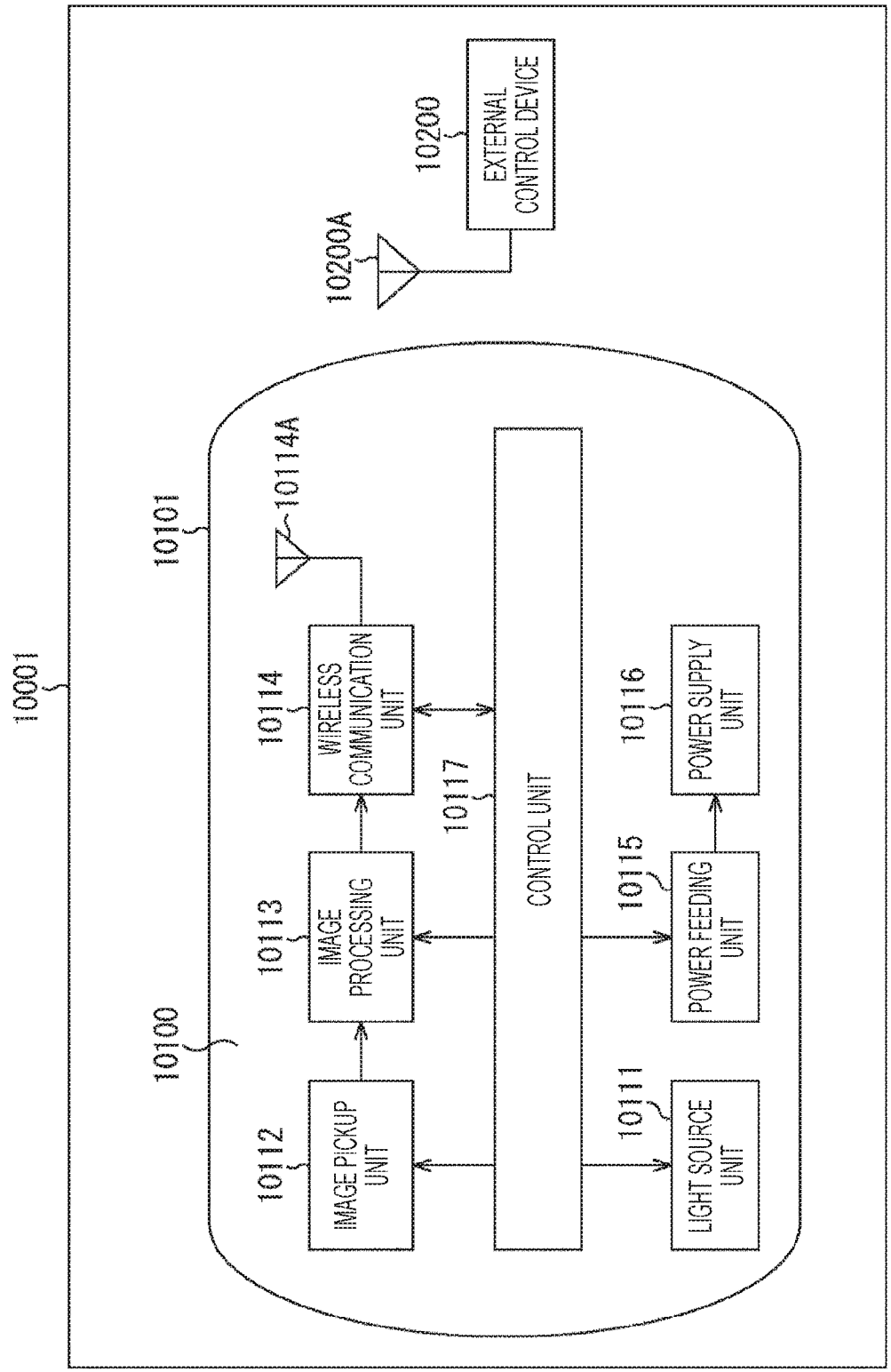
FIG. 16 is a block diagram illustrating an example of a schematic configuration of an in-vivo information acquiring system.

FIG. 16 is a block diagram illustrating an example of a schematic configuration of a patient's in-vivo information acquiring system using a capsule endoscope to which the present technology according to the present disclosure can be applied.

An in-vivo information acquiring system 10001 includes a capsule endoscope 10100 and an external control device 10200.

The capsule endoscope 10100 is swallowed by the patient at the time of examination. The capsule endoscope 10100 has an image pickup function and a wireless communication function, and while moving inside the internal organs such as the stomach and the intestines by peristaltic movement or the like until being naturally discharged from the patient, sequentially captures images inside the internal organs (hereinafter, also referred to as in-vivo images) at predetermined intervals, and sequentially transmits information on the in-vivo image wirelessly to the external control device 10200 outside the body.

The external control device 10200 comprehensively controls operation of the in-vivo information acquiring system 10001. Furthermore, the external control device 10200 receives the information on the in-vivo image transmitted from the capsule endoscope 10100, and generates image data for displaying the in-vivo image on a display device (not illustrated) on the basis of the received information on the in-vivo image.

In the in-vivo information acquiring system 10001, as described above, it is possible to obtain the captured in-vivo image of the inside of the patient's body at any time from the time when the capsule endoscope 10100 is swallowed until it is discharged.

Configurations and functions of the capsule endoscope 10100 and the external control device 10200 will be described in more detail.

The capsule endoscope 10100 includes a capsule type housing 10101, and inside the housing 10101, a light source unit 10111, an image pickup unit 10112, an image processing unit 10113, a wireless communication unit 10114, a power feeding unit 10115, a power supply unit 10116, and a control unit 10117 are housed.

The light source unit 10111 includes a light source, for example, a light emitting diode (LED) or the like, and emits light to an image pickup field of the image pickup unit 10112.

The image pickup unit 10112 includes an image pickup element and an optical system including a plurality of lenses provided in front of the image pickup element. Reflected light (hereinafter referred to as observation light) of the light emitted to body tissue as an observation target is collected by the optical system and is incident on the image pickup element. In the image pickup unit 10112, the observation light incident on the image pickup element is photoelectrically converted, and an image signal corresponding to the observation light is generated. The image signal generated by the image pickup unit 10112 is provided to the image processing unit 10113.

The image processing unit 10113 includes a processor such as a central processing unit (CPU), or a graphics processing unit (GPU), and performs various types of signal processing on the image signal generated by the image pickup unit 10112. The image processing unit 10113 provides the image signal subjected to the signal processing to the wireless communication unit 10114 as RAW data.

The wireless communication unit 10114 performs predetermined processing such as modulation processing on the image signal subjected to signal processing by the image processing unit 10113, and transmits the image signal to the external control device 10200 via an antenna 10114A. Furthermore, the wireless communication unit 10114 receives a control signal related to drive control of the capsule endoscope 10100 from the external control device 10200 via the antenna 10114A. The wireless communication unit 10114 provides the control signal received from the external control device 10200 to the control unit 10117.

The power feeding unit 10115 includes an antenna coil for power reception, a power regeneration circuit for regenerating power from a current generated in the antenna coil, a booster circuit, and the like. In the power feeding unit 10115, the power is generated using the principle of so-called non-contact charging.

The power supply unit 10116 includes a secondary battery, and stores the power generated by the power feeding unit 10115. In FIG. 16, for avoiding complication of the drawing, illustration of an arrow or the like indicating a supply destination of the power from the power supply unit 10116 is omitted; however, the power stored in the power supply unit 10116 is supplied to the light source unit 10111, the image pickup unit 10112, the image processing unit 10113, the wireless communication unit 10114, and the control unit 10117, and can be used for driving these units.

The control unit 10117 includes a processor such as a CPU, and appropriately controls drive of the light source unit 10111, the image pickup unit 10112, the image processing unit 10113, the wireless communication unit 10114, and the power feeding unit 10115, in accordance with the control signal transmitted from the external control device 10200.

The external control device 10200 includes a processor such as a CPU or a GPU, or a microcomputer, a control board, or the like on which the processor and a storage element such as a memory are mixedly mounted. The external control device 10200 transmits the control signal to the control unit 10117 of the capsule endoscope 10100 via an antenna 10200A, thereby controlling operation of the capsule endoscope 10100. In the capsule endoscope 10100, for example, by the control signal from the external control device 10200, a light emission condition can be changed with respect to the observation target, in the light source unit 10111. Furthermore, by the control signal from the external control device 10200, image pickup conditions (for example, a frame rate, an exposure value, and the like in the image pickup unit 10112) can be changed. Furthermore, by the control signal from the external control device 10200, details of processing in the image processing unit 10113, and conditions under which the wireless communication unit 10114 transmits the image signal (for example, a transmission interval, the number of transmitted images, and the like) may be changed.

Furthermore, the external control device 10200 performs various types of image processing to the image signal transmitted from the capsule endoscope 10100, and generates image data for displaying the captured in-vivo image on the display device. As the image processing, various types of signal processing can be performed, for example, development processing (demosaic processing), image quality improvement processing (band enhancement processing, super resolution processing, noise reduction (NR) processing and/or camera shake correction processing, and the like)

and/or enlargement processing (electronic zoom processing), and the like. The external control device 10200 controls drive of the display device to display the captured in-vivo image on the basis of the generated image data. Alternatively, the external control device 10200 may cause a recording device (not illustrated) to record the generated image data, or cause a printing device (not illustrated) to print out the generated image data.

In the above, an example has been described of the in-vivo information acquiring system to which the technology according to the present disclosure can be applied. The technology according to the present disclosure can be applied to the image pickup unit 10112 in the above-described configuration. Specifically, the compound-eye camera module 10 of FIGS. 1A and 1B can be applied to the image pickup unit 10112. By applying the technology according to the present disclosure to the image pickup unit 10112, for example, fluctuations are suppressed in compound eye accuracy, and a sharper image of a surgical portion can be obtained, so that accuracy of the examination can be improved.

<8. Application Example to Mobile Body>

The present technology according to the present disclosure can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, and the like.

Figure 17:
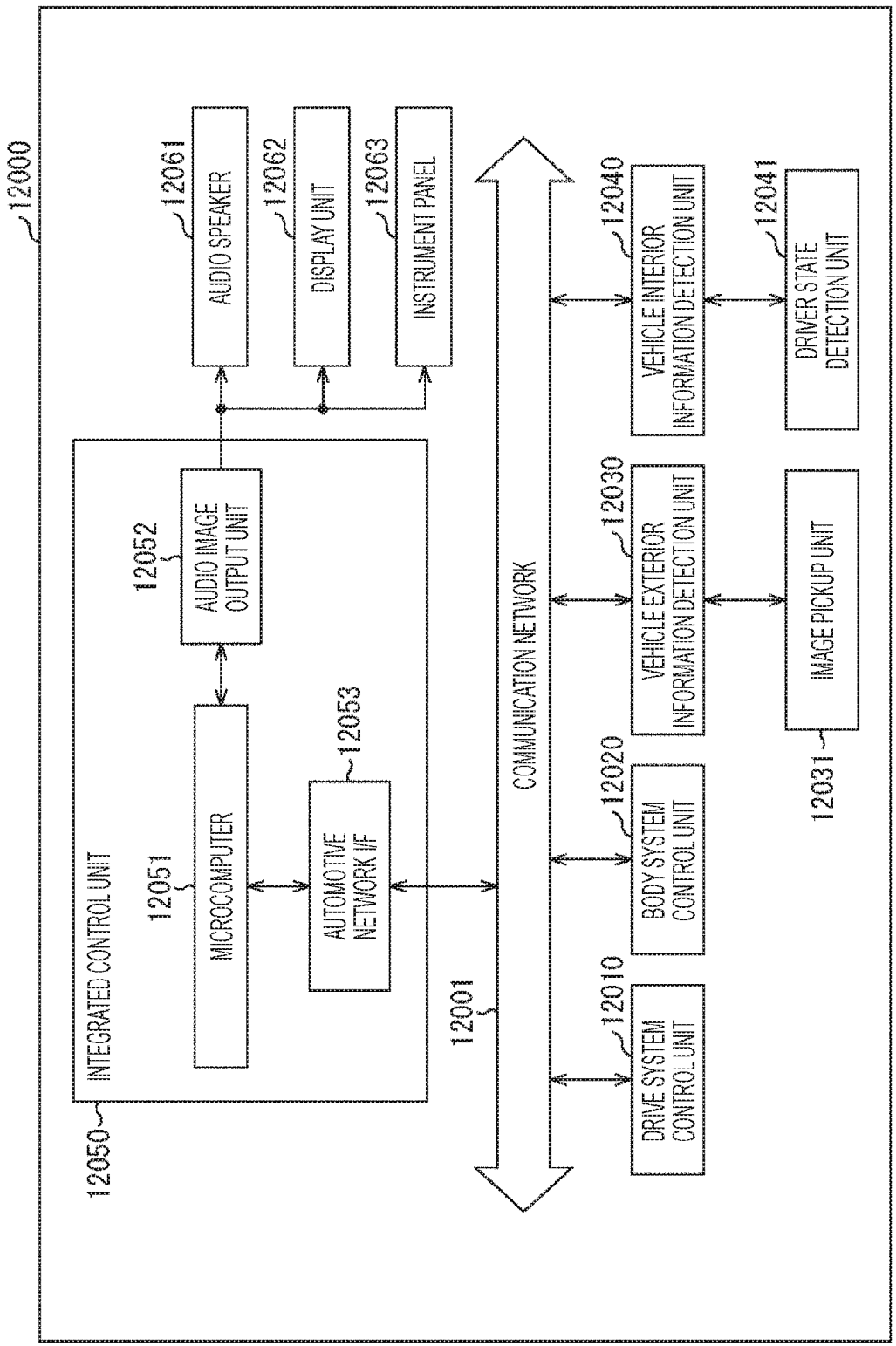
FIG. 17 is a block diagram illustrating an example of a schematic configuration of a vehicle control system.

FIG. 17 is a block diagram illustrating a schematic configuration example of a vehicle control system that is an example of a mobile body control system to which the technology according to the present disclosure can be applied.

A vehicle control system 12000 includes a plurality of electronic control units connected together via a communication network 12001. In the example illustrated in FIG. 17, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an automotive network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information on the outside of the vehicle on which the vehicle control system 12000 is mounted. For example, an image pickup unit 12031 is connected to the vehicle exterior information detection unit 12030. The vehicle exterior information detection unit 12030 causes the image pickup unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The image pickup unit 12031 is an optical sensor that receives light and outputs an electric signal corresponding to the amount of light received. The image pickup unit 12031 can output the electric signal as an image, or as distance measurement information. Furthermore, the light received by the image pickup unit 12031 may be visible light, or invisible light such as infrared rays.

The vehicle interior information detection unit 12040 detects information on the inside of the vehicle. The vehicle interior information detection unit 12040 is connected to, for example, a driver state detection unit 12041 that detects a state of a driver. The driver state detection unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detection unit 12041.

The microcomputer 12051 can calculate a control target value of the driving force generating device, the steering mechanism, or the braking device on the basis of the information inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information on the periphery of the vehicle acquired by the vehicle exterior information detection unit 12030 or the vehicle interior information detection unit 12040.

Furthermore, the microcomputer 12051 can output a control command to the body system control unit 12020 on the basis of information on the outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio and image output signals to an output device capable of visually or aurally notifying an occupant in the vehicle or the outside of the vehicle of information. In the example of FIG. 17, as the output device, an audio speaker 12061, a display unit 12062, and an instrument panel 12063 are illustrated. The display unit 12062 may include, for example, at least one of an on-board display and a head-up display.

Figure 18:
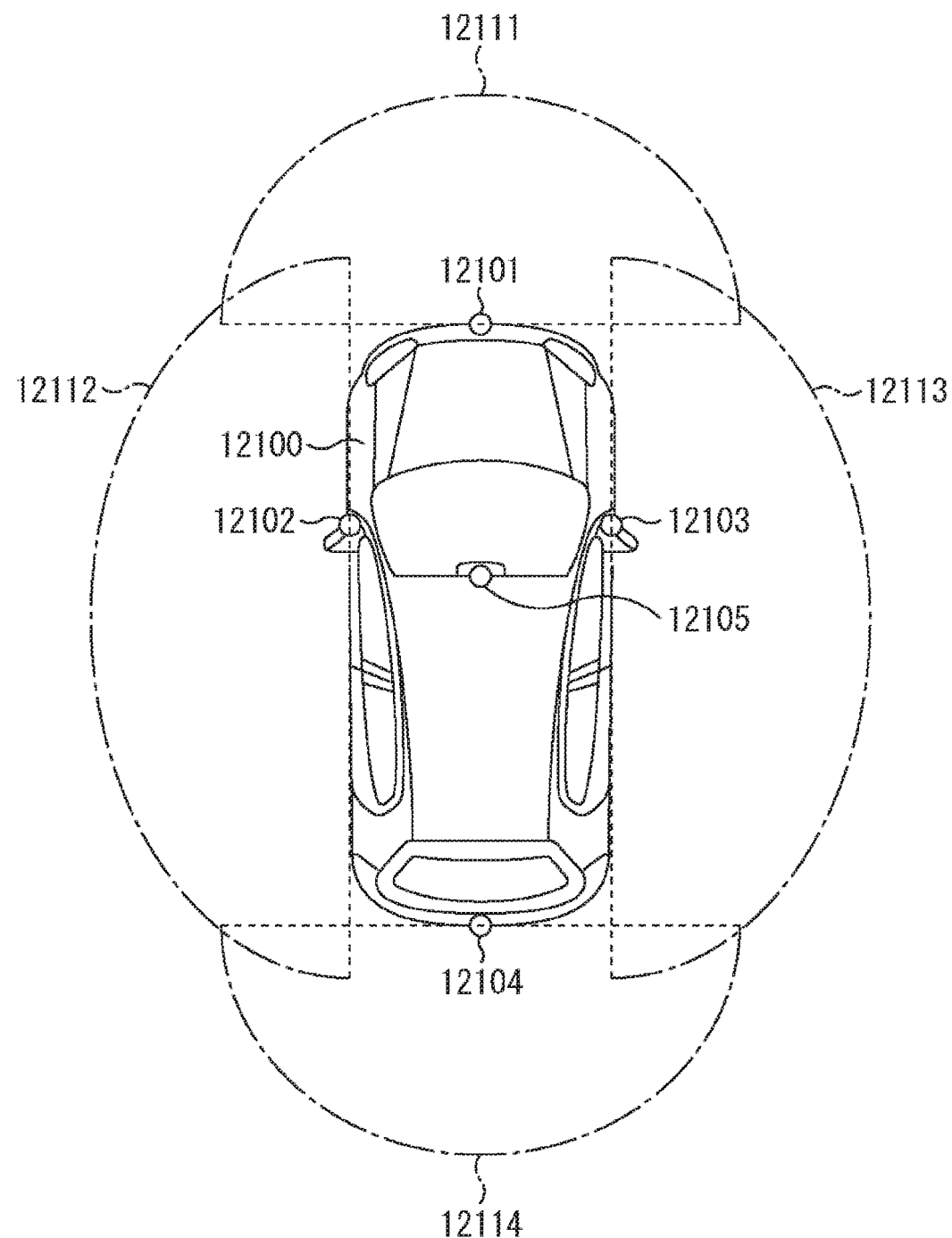
FIG. 18 is an explanatory diagram illustrating an example of installation positions of a vehicle exterior information detection unit and an image pickup unit.

FIG. 18 is a diagram illustrating an example of installation positions of the image pickup unit 12031.

In FIG. 18, a vehicle 12100 includes image pickup units 12101, 12102, 12103, 12104, and 12105 as the image pickup unit 12031.

The image pickup units 12101, 12102, 12103, 12104, and 12105 are provided at positions, for example, the front nose, the side mirror, the rear bumper, the back door, the upper part of the windshield in the vehicle interior, and the like, of the vehicle 12100. The image pickup unit 12101 provided at the front nose and the image pickup unit 12105 provided at the upper part of the windshield in the vehicle interior mainly acquire images ahead of the vehicle 12100. The image pickup units 12102 and 12103 provided at the side mirrors mainly acquire images on the sides of the vehicle 12100. The image pickup unit 12104 provided at the rear bumper or the back door mainly acquires an image behind the vehicle 12100. The front images acquired by the image pickup units 12101 and 12105 are mainly used for detection of a preceding vehicle, a pedestrian, an obstacle, a traffic signal, a traffic sign, a lane, or the like.

Note that, FIG. 18 illustrates an example of a photographing range of the image pickup units 12101 to 12104. An image pickup range 12111 indicates an image pickup range of the image pickup unit 12101 provided at the front nose, image pickup ranges 12112 and 12113 respectively indicate image pickup ranges of the image pickup units 12102 and 12103 provided at the side mirrors, an image pickup range 12114 indicates an image pickup range of the image pickup unit 12104 provided at the rear bumper or the back door. For example, image data captured by the image pickup units 12101 to 12104 are superimposed on each other, whereby an overhead image is obtained of the vehicle 12100 viewed from above.

At least one of the image pickup units 12101 to 12104 may have a function of acquiring distance information. For example, at least one of the image pickup units 12101 to 12104 may be a stereo camera including a plurality of image pickup elements, or an image pickup element including pixels for phase difference detection.

For example, on the basis of the distance information obtained from the image pickup units 12101 to 12104, the microcomputer 12051 obtains a distance to each three-dimensional object within the image pickup ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the image pickup units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to be visually recognized. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the image pickup units 12101 to 12104 may be an infrared camera that detects infrared rays. For example, the microcomputer 12051 can recognize a pedestrian by determining whether or not a pedestrian exists in the captured images of the image pickup units 12101 to 12104. Such pedestrian recognition is performed by, for example, a procedure of extracting feature points in the captured images of the image pickup units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the image pickup units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the above, an example has been described of the vehicle control system to which the technology according to the present disclosure can be applied. The technology according to the present disclosure can be applied to the image pickup unit 12031, in the above-described configuration. Specifically, the compound-eye camera module 10 of FIGS. 1A and 1B can be applied to the image pickup unit 12031. By applying the technology according to the present disclosure to the image pickup unit 12031, for example, fluctuations are suppressed in compound eye accuracy, and a more easily viewable captured image can be obtained, so that driver's fatigue can be reduced.

Note that, embodiments of the present technology are not limited to the above-described embodiments, and various modifications are possible within the scope not departing from the gist of the present technology.

Furthermore, the present technology can be configured as described below.

(1)

A compound-eye camera module including:

a plurality of monocular camera modules; and a connecting member that connects the plurality of monocular camera modules together, in which the plurality of monocular camera modules are connected together by fitting a camera-side positioning portion for positioning formed on a camera-side reference surface of each of the monocular camera modules and a member-side positioning portion for positioning formed on a member-side reference surface of the connecting member together.

(2)

The compound-eye camera module according to (1), in which each of the monocular camera modules is aligned in an optical axis direction.

(3)

The compound-eye camera module according to (2), in which the camera-side reference surface and the member-side reference surface are surfaces facing each other in the optical axis direction, and the camera-side positioning portion of the camera-side reference surface and the member-side positioning portion of the member-side reference surface facing the camera-side reference surface are respectively formed to have corresponding shapes at corresponding positions.

(4)

The compound-eye camera module according to (3), in which the connecting member has a rectangular plate shape, an insertion hole is penetratingly formed in the connecting member, the insertion hole being a portion in which a part of each of the monocular camera modules is inserted, and the part of each of the monocular camera modules is inserted and fixed in the insertion hole of the connecting member.

(5)

The compound-eye camera module according to (4), in which the camera-side reference surface is a part of a surface included in a frame attached to each of the monocular camera modules, and the camera-side positioning portion is formed on the part of the surface included in the frame.

(6)

The compound-eye camera module according to (4) or (5), in which the member-side reference surface is a part of a surface included in the connecting member, and the member-side positioning portion is formed on the part of the surface included in the connecting member.

(7)

The compound-eye camera module according to any of (1) to (6), in which the camera-side positioning portion is formed as a hole, and the member-side positioning portion is formed as a protrusion.

(8)

The compound-eye camera module according to any of (1) to (7), in which the compound-eye camera module includes one or a plurality of the camera-side positioning portions, and one or a plurality of the member-side positioning portions.

(9)

The compound-eye camera module according to (4), in which each of the monocular camera modules and the connecting member are fixed together in a detachable fixing method.

(10)

The compound-eye camera module according to (9), in which the connecting member is attached and fixed from an image pickup surface side of each of the monocular camera modules.

(11)

The compound-eye camera module according to any of (1) to (10), in which the connecting member is formed in a housing that houses the compound-eye camera module, as a part of the housing.

(12)

The compound-eye camera module according to any of (1) to (11), in which each of the monocular camera modules includes a solid-state image pickup element.

(13)

An electronic device including a compound-eye camera module including:

a plurality of monocular camera modules; and a connecting member that connects the plurality of monocular camera modules together, in which the plurality of monocular camera modules are connected together by fitting a camera-side positioning portion for positioning formed on a camera-side reference surface of each of the monocular camera modules and a member-side positioning portion for positioning formed on a member-side reference surface of the connecting member together.

REFERENCE SIGNS LIST

10 Compound-eye camera module
101, 101-1, 101-2 Monocular camera module
102 Connecting member
121, 121-1, 121-2 Sensor module
121A Sensor surface
122, 122-1, 122-2 Frame
122A Sensor-corresponding surface
131-1, 131-2 Reference mark
132-1, 132-2 Reference mark
133-1, 133-2 Reference mark
141-1, 141-2 Positioning hole
142-1, 142-2 Positioning hole
151-1, 151-2 Screw insertion hole
152-1, 152-2 Screw insertion hole
161-1, 161-2 Positioning protrusion
162-1, 162-2 Positioning protrusion
171-1, 171-2 Screw insertion hole
172-1, 172-2 Screw insertion hole
181-1, 181-2 Rectangular insertion hole
191-1, 191-2 Screw
192-1, 192-2 Screw
1000 Electronic device
1001 Compound-eye camera module

The invention claimed is:

1. A compound-eye camera module, comprising:
a plurality of monocular camera modules; and
a connecting member configured to connect the plurality of monocular camera modules together, wherein
a camera-side positioning portion on a camera-side reference surface of each monocular camera module of the plurality of monocular camera modules is fitted to a member-side positioning portion on a member-side reference surface of the connecting member,
each monocular camera module of the plurality of monocular camera modules comprises a lens unit mounted to a frame-attached sensor module such that an optical axis direction of the lens unit matches an optical axis direction of a sensor surface of the frame-attached sensor module,
the frame-attached sensor module comprises a frame attached to a sensor module,
the frame includes a protruding region,
the frame includes a first positioning hole and a first screw insertion hole in the protruding region,
the frame includes a second positioning hole and a second screw insertion hole on a side of the frame opposite to the protruding region of the frame,
the first positioning hole and the second positioning hole are engageable with respective positioning protrusions of the connecting member, and
the first screw insertion hole and the second screw insertion hole are engageable with respective screw insertion holes of the connecting member.

2. The compound-eye camera module according to claim 1, wherein
the camera-side reference surface faces the member-side reference surface in the optical axis direction, and
the camera-side positioning portion of the camera-side reference surface and the member-side positioning portion of the member-side reference surface facing the camera-side reference surface respectively have corresponding shapes at corresponding positions.

3. The compound-eye camera module according to claim 2, wherein
the connecting member has a rectangular plate shape,
an insertion hole is in the connecting member,
the insertion hole is a portion in which a part of each monocular camera module of the plurality of monocular camera modules is inserted, and
the part of each monocular camera module of the plurality of monocular camera modules is inserted and fixed in the insertion hole of the connecting member.

4. The compound-eye camera module according to claim 3, wherein
the camera-side reference surface is a part of a surface included in the frame attached to each monocular camera module of the plurality of monocular camera modules,
the camera-side positioning portion is on the part of the surface included in the frame.

5. The compound-eye camera module according to claim 4, wherein
the member-side reference surface is a part of a surface included in the connecting member, and
the member-side positioning portion is on the part of the surface included in the connecting member.

6. The compound-eye camera module according to claim 5, wherein
the camera-side positioning portion is a hole, and
the member-side positioning portion is a protrusion.

7. The compound-eye camera module according to claim 6, wherein the compound-eye camera module includes at least one camera-side positioning portion including the camera-side positioning portion, and at least one member-side positioning portion including the member-side positioning portion.

8. The compound-eye camera module according to claim 3, wherein each monocular camera module of the plurality of monocular camera modules is detachably fixed to the connecting member.

9. The compound-eye camera module according to claim 8, wherein the connecting member is attached and fixed from an image pickup surface side of each monocular camera module of the plurality of monocular camera modules.

10. The compound-eye camera module according to claim 1, wherein the connecting member is in a housing that houses the compound-eye camera module, as a part of the housing.

11. The compound-eye camera module according to claim 1, wherein each monocular camera module of the plurality of monocular camera modules includes a solid-state image pickup element.

12. The compound-eye camera module according to claim 1, wherein the frame is mounted to the sensor module by a six-axis correction mounting process.

13. The compound-eye camera module according to claim 1, wherein the frame of a first monocular camera module of the plurality of monocular camera modules is oriented 180 degrees with respect to the frame of a second monocular camera module of the plurality of monocular camera modules.

14. The compound-eye camera module according to claim 1, wherein the lens unit is attached to a first surface of the frame and the sensor module is attached to a second surface of the frame opposite to the first surface.

15. The compound-eye camera module according to claim 1, wherein the frame comprises a sensor-corresponding surface that includes a transparent optical member.

16. An electronic device, comprising:
a compound-eye camera module including:
a plurality of monocular camera modules; and
a connecting member configured to connect the plurality of monocular camera modules together, wherein
a camera-side positioning portion on a camera-side reference surface of each monocular camera module of the plurality of monocular camera modules is fitted to a member-side positioning portion on a member-side reference surface of the connecting member,
each monocular camera module of the plurality of monocular camera modules comprises a lens unit mounted to a frame-attached sensor module such that an optical axis direction of the lens unit matches an optical axis direction of a sensor surface of the frame-attached sensor module,
the frame-attached sensor module comprises a frame attached to a sensor module,
the frame includes a protruding region,
the frame includes a first positioning hole and a first screw insertion hole in the protruding region,
the frame includes a second positioning hole and a second screw insertion hole on a side of the frame opposite to the protruding region of the frame,
the first positioning hole and the second positioning hole are engageable with respective positioning protrusions of the connecting member, and
the first screw insertion hole and the second screw insertion hole are engageable with respective screw insertion holes of the connecting member.

17. An electronic device, comprising:
a compound-eye camera module including:
a plurality of monocular camera modules; and
a connecting member configured to connect the plurality of monocular camera modules together, wherein
a camera-side positioning portion on a camera-side reference surface of each monocular camera module of the plurality of monocular camera modules is fitted to a member-side positioning portion on a member-side reference surface of the connecting member, each monocular camera module of the plurality of monocular camera modules comprises a lens unit mounted to a frame-attached sensor module such that an optical axis direction of the lens unit matches an optical axis direction of a sensor surface of the frame-attached sensor module, the frame-attached sensor module comprises a frame attached to a sensor module, and the frame is mounted to the sensor module by a six-axis correction mounting process.

* * * * *